(12) United States Patent
Hou et al.

(10) Patent No.: US 10,412,563 B2
(45) Date of Patent: Sep. 10, 2019

(54) WIRELESS COMMUNICATION DEVICE AND WIRELESS COMMUNICATION METHOD

(71) Applicant: SONY CORPORATION, Tokyo (JP)

(72) Inventors: Yanzhao Hou, Beijing (CN); Qimei Cui, Beijing (CN); Hui Liang, Beijing (CN); Shiwei Cao, Beijing (CN); Qinyan Jiang, Beijing (CN); Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/579,040

(22) PCT Filed: May 24, 2016

(86) PCT No.: PCT/CN2016/083129
§ 371 (c)(1),
(2) Date: Dec. 1, 2017

(87) PCT Pub. No.: WO2016/197813
PCT Pub. Date: Dec. 15, 2016

(65) Prior Publication Data
US 2018/0084369 A1 Mar. 22, 2018

(30) Foreign Application Priority Data
Jun. 8, 2015 (CN) .......................... 2015 1 0308979

(51) Int. Cl.
*H04W 4/70* (2018.01)
*H04W 4/00* (2018.01)
(Continued)

(52) U.S. Cl.
CPC .............. *H04W 4/70* (2018.02); *H04W 4/00* (2013.01); *H04W 4/023* (2013.01); *H04W 4/026* (2013.01);
(Continued)

(58) Field of Classification Search
USPC .......................................... 455/500, 450–455
See application file for complete search history.

(56) References Cited

U.S. PATENT DOCUMENTS 9,191,828 B2   11/2015   Li et al.
9,326,121 B2   4/2016    Yang et al.
(Continued)

FOREIGN PATENT DOCUMENTS

CN    104412698 A       3/2015
WO    2014/098906 A1    6/2014
(Continued)

OTHER PUBLICATIONS

International Search Report dated Aug. 22, 2016 in PCT/CN2016/083129 filed May 24, 2016.

*Primary Examiner* — Fayyaz Alam
(74) *Attorney, Agent, or Firm* — Xsensus, LLP

(57) ABSTRACT

Disclosed are a wireless communication device and a wireless communication method. The wireless communication device according to one embodiment comprises one or more processors. The processors are configured so as to: on the basis of auxiliary dissemination limitation information about a source device as an information dissemination source, acquire device information about candidate devices capable of establishing direct communication with the source device; on the basis of the locations of the source device and the candidate devices, select a target device for establishing direct communication with the source device from the candidate devices; and determine a transmission resource for direct communication with the target device and generate a transmission resource scheduling indication.

27 Claims, 15 Drawing Sheets

(51) Int. Cl.

| | | |
|---|---|---|
| *H04W 72/12* | (2009.01) | |
| *H04W 4/02* | (2018.01) | |
| *H04W 4/04* | (2009.01) | |
| *H04W 8/00* | (2009.01) | |
| *H04W 4/40* | (2018.01) | |
| *H04W 88/04* | (2009.01) | |

(52) U.S. Cl.
 CPC ........... *H04W 4/027* (2013.01); *H04W 4/046* (2013.01); *H04W 4/40* (2018.02); *H04W 8/005* (2013.01); *H04W 72/12* (2013.01); *H04W 88/04* (2013.01)

(56) References Cited

U.S. PATENT DOCUMENTS

| | | |
|---|---|---|
| 2014/0036769 A1 | 2/2014 | Stojanovski et al. |
| 2014/0040498 A1 | 2/2014 | Oyman et al. |
| 2015/0189521 A1 | 7/2015 | Chou et al. |
| 2015/0201375 A1 | 7/2015 | Vannithamby et al. |
| 2015/0334157 A1 | 11/2015 | Oyman et al. |
| 2015/0341773 A1* | 11/2015 | Ribeiro ................ H04W 8/005 370/329 |
| 2016/0128116 A1* | 5/2016 | Kim ..................... H04W 76/14 370/329 |
| 2016/0192172 A1 | 6/2016 | Kim et al. |
| 2016/0295624 A1* | 10/2016 | Novlan ................ H04W 76/14 |
| 2017/0034751 A1* | 2/2017 | Fujishiro ........... H04W 36/0083 |

FOREIGN PATENT DOCUMENTS

| | | |
|---|---|---|
| WO | 2014/114263 A1 | 7/2014 |
| WO | 2015/016689 A1 | 2/2015 |

* cited by examiner

WIRELESS COMMUNICATION DEVICE AND WIRELESS COMMUNICATION METHOD

FIELD

The present disclosure generally relates to the field of wireless communication, and in particular to a wireless communication device and wireless communication method.

BACKGROUND

Proximity-based service (ProSe) direct communication, such as device-to-device (D2D) communication, in a cellular network usually refers to a service for directly transmitting user data between terminals without a network transit. The D2D communication reduces a load of a base station, and remedies a defect that it is unable to perform effective communication between cellular devices outside a coverage of the base station.

The D2D communication may be applied to a variety of scenarios including for example: traffic data at a user plane may be directly transmitted locally without going through a network side, to for example achieve offloading of cellular network traffic; wireless communication between terminals is ensured with the D2D communication in a case where infrastructure of a traditional communication network is damaged due to a natural disaster; and an enhanced D2D communication for the Internet of Things, etc. In particular, as a typical application scenario of the Internet of Things, the D2D communication may include communication between a vehicle and an associated entity (V2X communication). The V2X communication may include, for example, vehicle-to-vehicle (V2V), vehicle-to-infrastructure (V21), and vehicle-to-pedestrian (V2P) communications, etc.

SUMMARY

An overview of the present disclosure is given hereinafter to provide basic understanding for certain aspects of the present disclosure. It should be understood that, the overview is not exhaustive overview of the present disclosure. The overview is neither intended to determine key parts or important parts of the present disclosure, nor intended to limit the scope of the present disclosure. The object of the overview is only to give some concepts of the present disclosure in a simplified form, as a preface of the detailed description later.

A wireless communication device is provided according to an embodiment, which includes one or more processors configured to acquire, based on auxiliary information on propagation limitation of a source device as a source of information propagation, device information of candidate devices capable of establishing direct communication with the source device; select, from the candidate devices, a target device which is to establish direct communication with the source device based on positions of the source device and the candidate devices; and determine a transmission resource for the direct communication with the target device and generate a transmission resource scheduling indication.

A wireless communication method is provided according to another embodiment, which includes: acquiring, based on auxiliary information on propagation limitation of a source device as a source of information propagation, device information of candidate devices capable of establishing direct communication with the source device; selecting, from the candidate devices, a target device which is to establish direct communication with the source device based on positions of the source device and the candidate devices; and determining a transmission resource for the direct communication with the target device and generating a transmission resource scheduling indication.

A wireless communication device is provided according to yet another embodiment, which includes one or more processors configured to: determine, based on auxiliary information on propagation limitation included in a discovery signal from a source device as a source of information propagation, whether to serve as a candidate device capable of establishing direct communication with the source device; generate a response signal containing device information of the wireless communication device in a case where it is determined to serve as the candidate device; and monitor a transmission resource scheduling indication for direct communication, to acquire a transmission resource. The acquisition of transmission resource for direct communication with the source device is related to a position of the wireless communication device.

A wireless communication method is provided according to still another embodiment, which includes: determining, based on auxiliary information on propagation limitation included in a discovery signal from a source device as a source of information propagation, whether to serve as a candidate device capable of establishing direct communication with the source device; generating a response signal containing device information of the wireless communication device in a case where it is determined to serve as the candidate device; and monitoring a transmission resource scheduling indication for direct communication, to acquire a transmission resource. The acquisition of the transmission resource for direct communication with the source device is related to a position of the wireless communication device.

A wireless communication device is provided according to yet another embodiment, which includes one or more processors configured to: generate road safety information in response to a road safety event; generate a resource scheduling request for a serving base station, to transmit the road safety information; and acquire transmission resources for a discovery signal and a broadcast signal related to the road safety information, respectively, corresponding to the resource scheduling request.

According to embodiments of the present disclosure, a device which is to establish direct communication with a source device is selected efficiently and rationally based on a propagation requirement of information to be propagated, thereby improving an efficiency of information propagation.

BRIEF DESCRIPTION OF THE DRAWINGS

The present disclosure may be better understood with reference to the following description given in conjunction with the drawings, in which, same or like reference numerals are used to denote the same or like components throughout the drawings. The drawings are contained in the description together with the following detailed illustration and form a part of the description, and are used to further illustrate preferred embodiments of the present disclosure and explain principles and advantages of the present disclosure by examples. In the drawings.

DETAILED DESCRIPTION OF EMBODIMENTS

Figure 1:
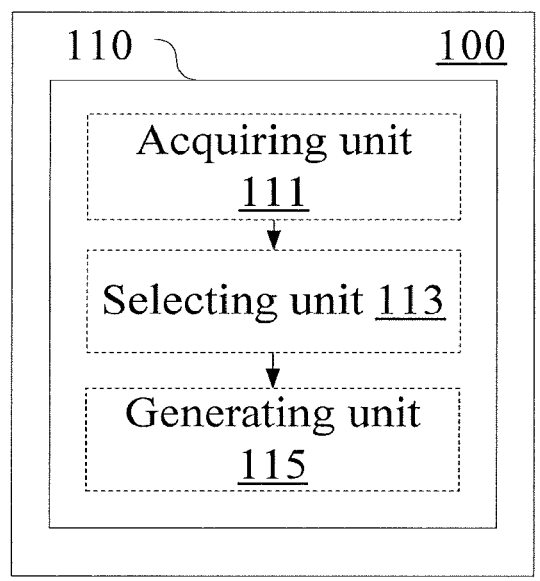
FIG. 1 is a block diagram showing a configuration example of a wireless communication device according to an embodiment of the present disclosure.

The embodiments of the present disclosure are described below with reference to the drawings. Elements and features described in one of the drawings or one embodiment of the present disclosure may be combined with elements and features described in one or more other drawings or embodiments. It should be noted that, for clarity, representation and description of components and processing which are irrelevant to the present disclosure and known by those skilled in the art are omitted in the drawings and the specification.

As shown in FIG. 1, a wireless communication device 100 according to an embodiment includes a processor 110. The processor 110 includes an acquiring unit 111, a selecting unit 113 and a generating unit 115. It should be noted that, although the acquiring unit 111, the selecting unit 113 and the generating unit 115 are shown in a form of function modules in FIG. 1, it should be understood that, functions of the acquiring unit 111, the selecting unit 113 and the generating unit 115 may also be implemented by the processor 110 as a whole, and are not necessarily implemented by actual discrete components in the processor 110. In addition, although the processor 110 is shown as one block in the figure, the communication device 100 may include multiple processors, and functions of the acquiring unit 111, the selecting unit 113 and the generating unit 115 may be distributed to the multiple processors, such that the multiple processors operate in cooperation to perform these functions.

The wireless communication device 100 according to the embodiment is configured to determine a target device to establish direct communication with a source device as a source of information propagation, and schedule a transmission resource for the direct communication. In other words, the wireless communication device 100 functions as a control terminal for the direct communication. As described below in conjunction with a specific embodiment, the wireless communication device 100 may be a serving base station of the source device (which corresponds to a solution in which a base station serves as a control terminal) or the source device itself (which corresponds to a solution in which the source device itself serves as a control terminal).

In addition, devices as two communication parties of the direct communication may include various user equipments having wireless communication functions. In particular, in an application scenario of direct communication involving a vehicle, the following situations may be included: the source device is a vehicle and the target device is a vehicle; the source device is a vehicle and the target device is a related entity (such as a roadside device); the source device is a related entity (such as a roadside device) and the target device is a vehicle. The roadside device is, for example, traffic infrastructure such as a roadside charging infrastructure (such as a charging pile), a traffic light, and a parking meter having a function of performing wireless communication with a communication terminal such as a vehicle. The roadside device has, for example, a communication unit installed thereon to perform wireless communication with the vehicle.

The acquiring unit 111 is configured to acquire, based on auxiliary information on propagation limitation of a source device as a source of information propagation, device information of candidate devices capable of establishing direct communication with the source device.

The auxiliary information on propagation limitation indicates limitations on the information propagation. For example, in a case where a source device for broadcasting information does not determine a communication target (for example, there is not an ID of a target device), or a receiving device does not determine whether to receive the broadcasted information, communication efficiency can be improved with the auxiliary information on propagation limitation. For example, depending on a specific application scenario and information to be propagated, it may be desirable to propagate information only in a particular direction, and the auxiliary information on propagation limitation may include a propagation direction of information. In addition, it may be desirable to propagate information only to a target device in a particular state, for example, only to a device in a specific motion state (for example, at a specific velocity or in a specific motion direction), and accordingly, the auxiliary information on propagation limitation may include a velocity or a motion direction (of the source device or the target device) and so on. In yet another example, it is desirable to propagate information only to a target device having a signal reception quality meeting a predetermined condition, for example, only to a device having reception quality greater than a predetermined threshold, and accordingly, the auxiliary information on propagation limitation may include the predetermined threshold. In addition, the auxiliary information on propagation limitation may also include a content type of the information to be propagated, thereby a target device may be determined correspondingly based on the content type. According to an embodiment, the auxiliary information on propagation limitation may indicate a motion direction and/or a position relative to the source device of a desired object of the information propagation. More specifically, the auxiliary information on propagation limitation may include a velocity and a motion direction of the source device, and an identifier of the information to be propagated.

The direct communication is, for example, ProSe direct communication previously mentioned, such as D2D communication and V2X communication.

Depending on specific applications, device information of the candidate device may include one or more of an identifier, a position, a velocity and so on, of the candidate device. In a case where the wireless communication device 100 is a base station, the wireless communication device 100 may obtain device information directly from the candidate device (for example, the base station receives GPS information of the candidate device from the candidate device), or the wireless communication device 100 may measure device information such as the position and the velocity on the candidate device (for example, the base station measures the device information with a positioning reference signal or an angle of direction arrival or the like). In a case where the wireless communication device 100 is a source device, the wireless communication device 100 may acquire device information of the candidate device through information interaction with the candidate device.

With respect to the candidate device, it should be noted that in some examples of the present disclosure, it is not necessary for the wireless communication device 100 to determine which devices are the candidate devices, instead, a device that receives a discovery signal can determine whether to serve as a candidate device capable of establishing direct communication with the source device, for example, based on information carried in the discovery signal, and responds to the discovery signal in a case where it is determined to serve as the candidate device. It will be described in detail below in conjunction with specific embodiments on candidate device side.

It should also be noted that in the case where the wireless communication device 100 is a base station, in a process of acquiring the device information of the candidate device based on the auxiliary information on propagation limitation, the base station does not necessarily obtain the auxiliary information on propagation limitation from the source device, instead, the source device broadcasts the auxiliary information on propagation limitation to devices within a signal coverage of the source device, and a device which has received the broadcasted information determines whether to provide device information and provides the device information to the base station. The above process also belongs to the case of acquiring device information of a candidate device based on auxiliary information on propagation limitation.

Continue to refer to FIG. 1, based on the information acquired by the acquiring unit 111, the selecting unit 113 selects a target device which is to establish direct communication with the source device from the candidate devices based on positions of the source device and the candidate devices.

According to an embodiment, the selecting unit 113 selects a candidate device which satisfies one or more of the following conditions as a target device:

i) being located in an information propagation direction with respect to the source device;

ii) having a motion direction same as the source device.

By selecting the target device in this manner, an appropriate target device may be selected for an information propagation having a direction requirement. This type of applications includes, for example, traffic information propagated via the V2X communication, which will be described in more detail later in conjunction with specific embodiments. However, the information propagation having a direction requirement is not limited to propagation of the traffic information, and may further include propagation of a variety of messages that is propagated by other user equipments via D2D communication. For example, a shop may transmit promotional information or advertising information only to users who move towards the shop.

Continue to refer to FIG. 1, the generating unit 115 is configured to determine a transmission resource for the direct communication with the target device and generate a transmission resource scheduling indication.

It should be noted that, in the case where the wireless communication device 100 is a source device, instead of performing resource scheduling via the base station, the wireless communication device 100 may determine a communication resource for the direct communication autonomously, for example, determines a physical resource block for transmission.

According to the embodiment, a target device which is to establish direct communication is selected targetedly based on a propagation requirement of information to be propagated, thereby improving efficiency of the information propagation.

According to an embodiment, the selected target device may serve as a relay node for the information propagation of the source device. In other words, a target device may not only serve as a receiving terminal of the information propagation, but also propagate information to a target device in a next stage. During the process of information propagation in the next stage, a target device may be selected for the relay node in a similar manner and direct communication is established. Similarly, multi-hop propagation of information may be performed with multi-stage relay.

In a specific example, the auxiliary information on propagation limitation includes two parts: a first part indicates a limitation condition related to establishment of direct communication with the source device (for example, a condition related to the motion direction described above); and a second part indicates a limitation condition related to serving as a relay node used for information propagation of the source device (for example, a condition related to the signal reception quality described above). Upon receiving a signal including auxiliary information on propagation limitation of a source device, a communication device determines whether to serve as a candidate device which is to establish direct communication with the source device based on a first part of the auxiliary information on propagation limitation, and determines whether to serve as a relay node based on a second part of the auxiliary information on propagation limitation if the wireless communication device is determined to serve as the candidate device, in turn, the communication device makes a response to the source device indicating that the communication device serves as the candidate device and the relay node.

As described above, the embodiment of the present disclosure may be applied to a V2X communication scenario, information to be propagated by the source device may include road safety information, and the source device and the candidate devices may include vehicles or roadside devices. Taking a propagation requirement of the road safety information into account, the target device may be selected based on relative motion relationship and/or position relationship between the source device and the target device.

According to an embodiment, the source device is a vehicle, and the selecting unit 113 may be configured to select a target device based on relative velocities of the candidate devices relative to the source device. A candidate device having low relative velocity has high priority. A candidate device having a velocity close to a velocity of the source device is selected as a target device preferably, thereby facilitating improving stability of the direct communication between the source device and the target device.

According to another embodiment, the source device is a vehicle, and the selecting unit 113 may be configured to select a target device based on distances of the candidate devices from the source device. A candidate device having a large distance from the source device has a high priority. In a case where the target device serves as the relay node for information propagation, a device having a far distance from the source device is selected preferably for relaying the information, thereby improving efficiency of the information propagation.

In addition, a target device may also be selected based on both of relative velocities of the candidate devices relative to the source device and distances of the candidate devices from the source device. For example, the target device may be selected based on a priority represented by the following equation (1):

$$h(d_i, \Delta v_i) = \alpha \frac{d_i}{r} - \beta \frac{\text{abs.}(\Delta v_i)}{v} \qquad \text{Equation (1)}$$

where $h(d_i, \Delta v_i)$ represents a priority of an i-th candidate device, $d_i$ represents a distance of the i-th candidate device from the source device, $\text{abs.}(\Delta v_i)$ represents an absolute value of a relative velocity of the i-th candidate device relative to the source device, r represents a broadcast radius of the source device, v represents a velocity of the source device, and α and β represent weight coefficients of the distance and the relative velocity, respectively.

In addition, in a case where the road safety information to be propagated relates to a stationary event (for example, a vehicle is parked on a road due to a fault or the like, or there are other fixed obstruction on the road), a roadside device may be selected preferably to serve as a relay node for the information propagation. In this case, the source device may be a stationary device (for example, a fault vehicle), or may be a moving device (for example, a vehicle that discovers an obstacle on the road during moving).

It should be noted that, in conjunction with specific application scenarios of the present disclosure, a target device may be selected only based on a position relationship between the source device and the target device. For example, in a case where devices that have same motion directions as the source device are selected to serve as candidate devices, when the source device discovers a road obstacle on the way, only a candidate device located at the rear of the source device is selected to serve as a target device, thereby effectively prompting a vehicle at the rear without increasing a load of a vehicle at the front for receiving and parsing a useless message.

As described above, according to an embodiment, the candidate device is a device that transmits a response signal to the wireless communication device in response to the discovery signal transmitted from the source device, where the response signal includes device information of the candidate device. The embodiment is described subsequently with reference to FIG. 2.

Figure 2:
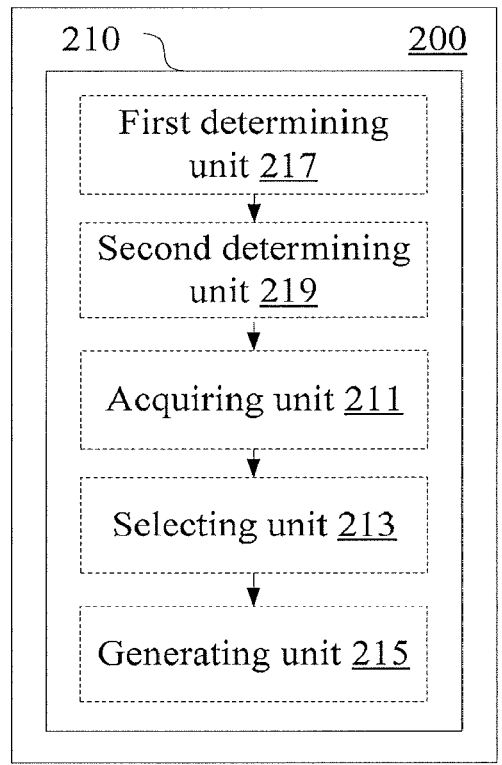
FIG. 2 is a block diagram showing a configuration example of a wireless communication device according to another embodiment.

As shown in FIG. 2, a wireless communication device 200 includes a processor 210. The processor 210 includes an acquiring unit 211, a selecting unit 213, a generating unit 215, a first determining unit 217 and a second determining unit 219. Configurations of the acquiring unit 211, the selecting unit 213 and the generating unit 215 are similar to those of the acquiring unit 111, the selecting unit 113 and the generating unit 115 described above with reference to FIG. 1.

The first determining unit 217 is configured to determine a time delay, and the second determining unit 219 is configured to determine devices that respond to the discovery signal transmitted from the source device in the determined time delay as candidate devices.

In addition, as described above, the embodiments of the present disclosure may include a situation where multi-stage relay is performed on information, the target device may serve as a relay node of the source device, and the source device itself may also be a relay node of another device. In this case, the first determining unit 217 may be configured to determine a time delay based on the number of relay stages of the source device relative to an initial information source for information propagation. More specifically, as the number of relay stages increases, a corresponding time delay may be increased to a certain extent, which is mainly based on the following: during propagation of the road safety information, as the number of relay stages increases, a promptness requirement for selecting a relay node is reduced due to a long distance from the information source. In this case, more devices can be allowed to respond by appropriately increasing the time delay, so that the acquiring unit 211 may acquire device information of more candidate devices and the selecting unit 213 may select a more suitable target device.

On the other hand, a maximum time delay may also be set, and the first determining unit 217 may be configured to determine a time delay which does not exceed the maximum time delay.

For example, the first determining unit 217 may determine a time delay based on the following Equation (2)

$$T(j) = \min \cdot (T + (j-1) * \Delta T, T_{max}) \qquad \text{Equation (2)}$$

where j is the number of relay stages, T is a time delay under a strict time delay requirement (for example, a time delay adopted when a first-stage relay node is selected), $\Delta T$ is a step increment of a time threshold, and $T_{max}$ is a maximum time delay. Min. (X, Y) represents a minimum value among X and Y. A value of the maximum time delay may be set according to specific applications.

As described above, the wireless communication device according to the embodiment of the present disclosure may be a serving base station of the source device or the source device itself, and configuration examples of a wireless communication device implemented as the base station or a wireless communication device implemented as the source device are described below, respectively.

Figure 3:
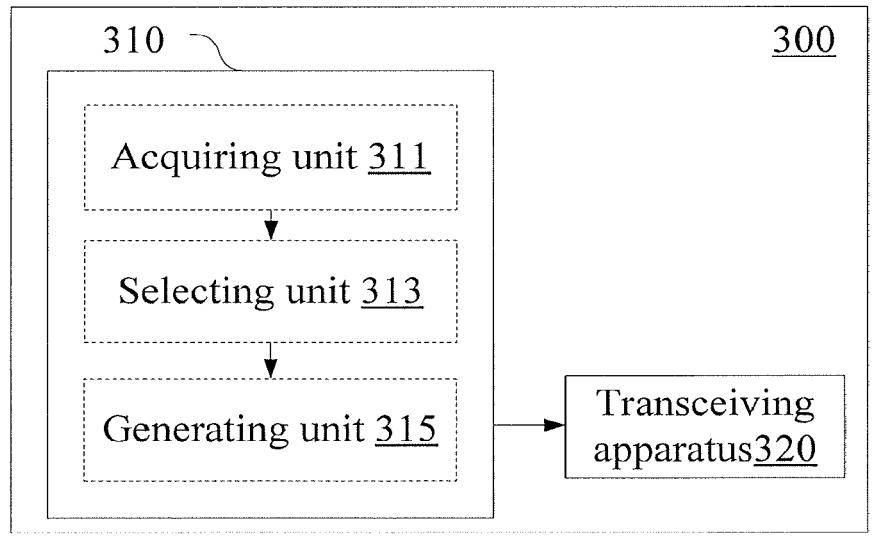
FIG. 3 is a block diagram showing a configuration example of a base station as an exemplary embodiment of a wireless communication device.

FIG. 3 shows a configuration example of a wireless communication device implemented as a base station according to an embodiment.

A wireless communication device 300 according to the embodiment includes a processor 310 and a transceiving apparatus 320. The processor includes an acquiring unit 311, a selecting unit 313 and a generating unit 315. Configurations of the acquiring unit 311, the selecting unit 313 and the generating unit 315 are similar to those of the acquiring unit 111, the selecting unit 113, and the generating unit 115 described above with reference to FIG. 1.

The transceiving apparatus 320 is configured to receive a response signal from a candidate device. The response signal includes device information of the candidate device and the device information contains an identifier and a position of the candidate device.

In the embodiment, the base station receives the device information reported by the candidate devices and selects a target device which is to directly communicate with the source device from the candidate devices. However, the candidate devices may report the device information to the base station in response to discovery information broadcasted by the source device, i.e., triggered by a discovery signal, thereby reducing communication resource consumption between the devices and the base station.

Thus, according to an embodiment, the generating unit 315 may be further configured to allocate, to the source device, a transmission resource for transmitting the discovery signal, and indicate the allocated transmission resource by a transmission resource scheduling indication. Accordingly, the transceiving apparatus 320 may be further configured to transmit the transmission resource scheduling indication to the source device.

In addition, the base station may refer to information to be propagated when selecting a target device. Accordingly, the generating unit 315 may be further configured to allocate, to the source device, a transmission resource for reporting to the base station the information to be propagated, and indicate the allocated transmission resource by a transmission resource scheduling indication.

In addition, multiple target devices can be selected from the candidate devices to establish direct communication with the source device, and a target device is further selected from the multiple target devices as a relay node for information propagation. According to an embodiment, the selecting unit 313 may be configured to: select multiple target devices from the candidate devices and determine a relay node from the multiple target devices based on positions of the multiple target devices. The generating unit 315 may allocate to the relay node a transmission resource for relaying. Accordingly, the transceiving apparatus 320 may be configured to transmit transmission resource scheduling indications to the determined multiple target devices. Here, the transmission resource scheduling indications transmitted to the multiple target devices include transmission resource position information which the multiple target devices need to monitor (the source device broadcast will use these transmission resources). In a specific example, a transmission resource scheduling indication transmitted to a device serving as the relay node further includes transmission resource position information used when the device transmits a signal when performing the relay (i.e., allocated transmission resource). Difference from a case in the conventional technology that the base station transmits an uplink transmission resource scheduling indication in response to a scheduling request of a communication device, in the embodiment, the base station actively determines that the device designated as the relay node will have a transmission requirement, and allocates a transmission resource directly without being an external trigger, thereby saving a resource consumption and a time delay for transmitting the scheduling request by the communication device.

The solution of the present disclosure can also be applied to a case where the source device and the candidate device are served by different base stations, respectively. For example, in a case where the source device is served by the present base station and some of the candidate devices are served by another base station, the present base station may obtain information of the corresponding candidate devices from the other base station. On the other hand, in a case where the source device is served by another base station and candidate devices capable of establishing direct communication with the source device are served by the present base station, the present base station may provide information of the candidate devices to the other base station, so that the other base station may determine a target device for the source device. Thus, according to an embodiment, the transceiving apparatus 320 is further configured to notify information on response signals to another base station or acquire information of the candidate devices from another base station. For example, the device information of the candidate devices may be contained in X2 signaling and communication between base stations may be performed via an X2 interface.

Next, a specific example of an embodiment in which a target device is selected by a base station is described with reference to FIG. 14 and FIG. 15. In this example, the source device is a vehicle, the candidate devices are vehicles or roadside devices, and the information to be propagated is road safety information. However, it should be understood that some aspects of the following example are also be applied to other application scenarios.

Figure 14:
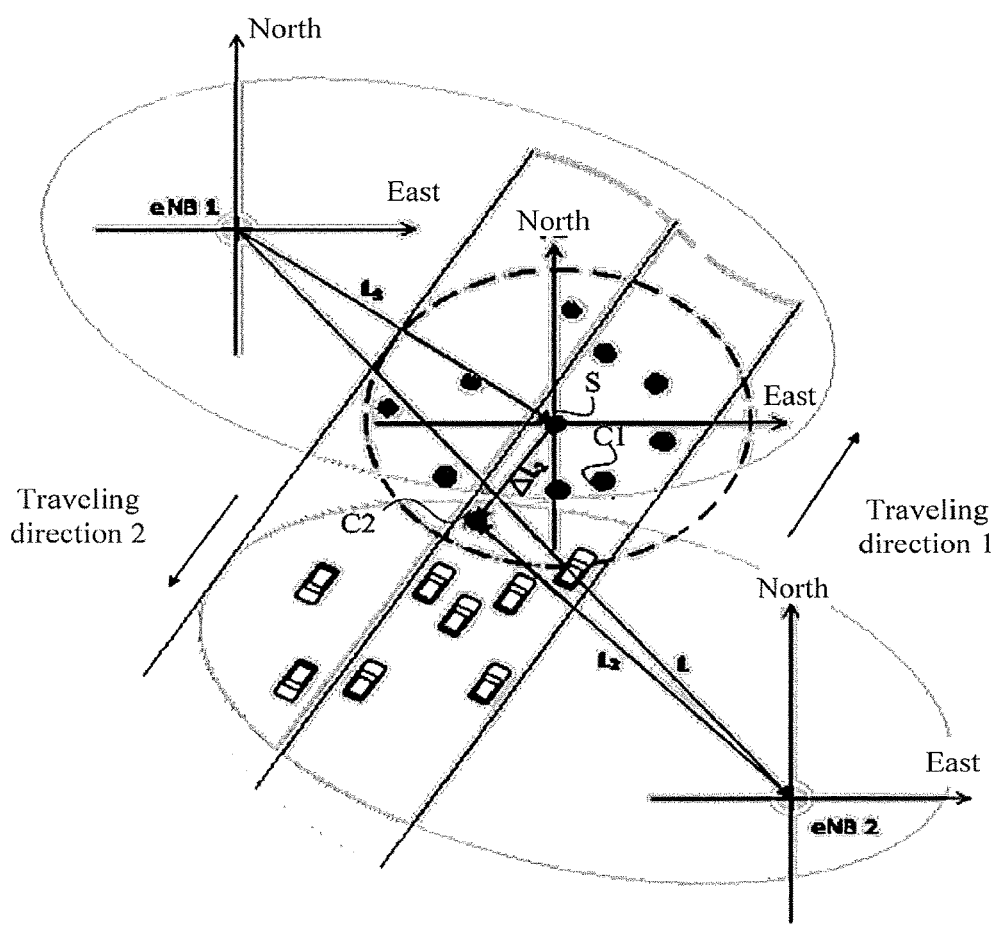
FIG. 14 is a schematic diagram showing a V2V communication scenario as an application example according to an embodiment of the present disclosure.

As shown in the schematic diagram of FIG. 14, a part of vehicles in the FIG. 14 travel in a driving direction 1 on a lane corresponding to the driving direction 1, and the other part of the vehicles travel in a driving direction 2 on a lane corresponding to the driving direction 2. A source device S is located in the coverage of a base station eNB1, and a dotted line in FIG. 14 denotes a broadcast signal coverage of the source device S, and a vehicle in the broadcast signal coverage of the source device S is denoted by a dot. As an exemplary candidate device, a candidate device C1 is located in the coverage of the base station eNB1, and a candidate device C2 is located in the coverage of a base station eNB2.

Figure 15:
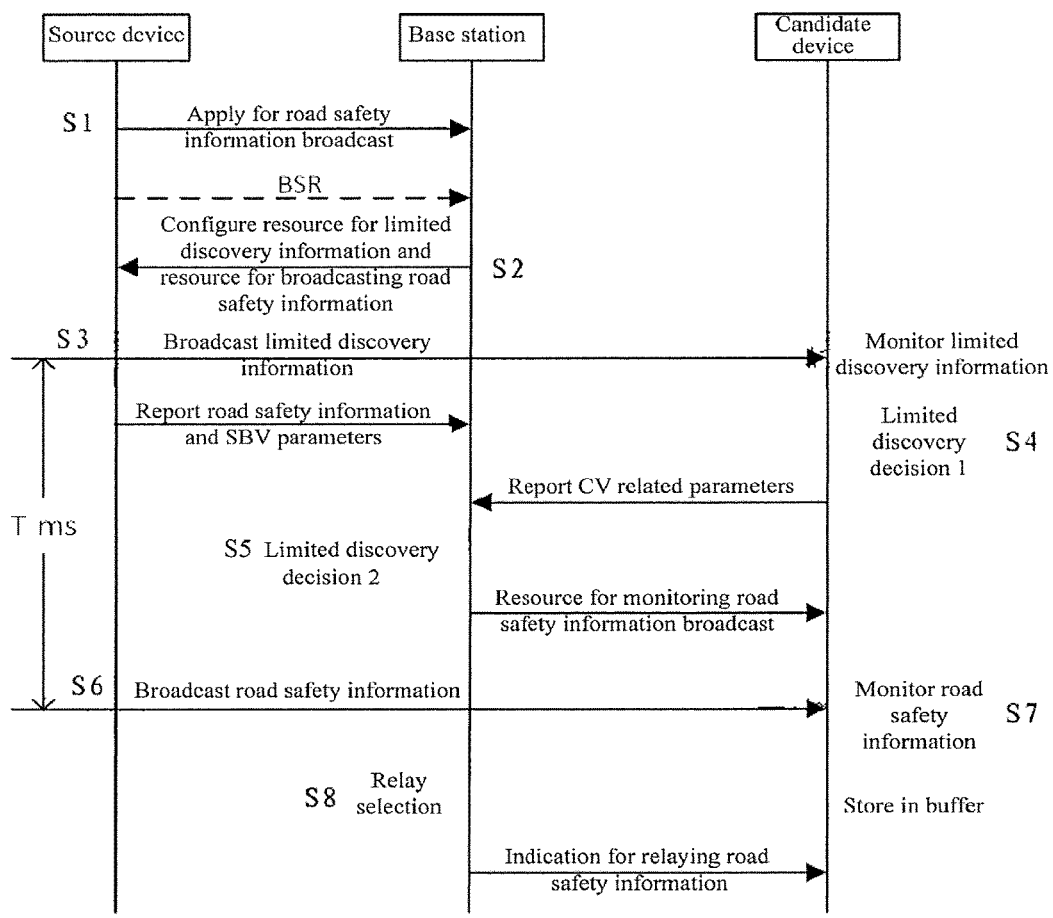
FIG. 15 is a flowchart showing an exemplary communication process of a V2V communication scenario as an application example according to an embodiment of the present disclosure.

Next, an exemplary process is described further with reference to FIG. 15.

In step S1, the source device applies to the base station for road safety information broadcast. For example, the source device triggers the road safety information broadcast after encountering a road safety event. The source device transmits a broadcast request to the base station (for example, via a physical uplink control channel (PUCCH)), and may report a buffer status report (BSR) subsequently.

In a specific example, the source device end generates limited discovery information in a fixed format and stores the limited discovery information in a buffer. Due to the fixed format, data volume corresponding to the fixed format is known to the base station in advance. Thus, in this example, the actual buffer data volume is not required to be reported, for example, only a BSR of a padding bit may be transmitted. The base station determines that the request is related to the road safety information broadcast based on, for example, a relationship between a request of the source device and a transmission timing of the BSR as well as the format of the BSR. The limited discovery information may include, for example, an identifier (ID) of the source device, an ID of the road safety information and a traveling velocity and a traveling direction of the source device. The ID of the source device and the ID of the road safety information may be used to uniquely identify an event.

Examples of a generation of buffered information and a storage format of the limited discovery information are as follows.

The traveling velocity of the source device in conjunction with the traveling direction is decomposed into a vector due east and a vector due north, i.e., $V=(V_E, V_N)$, where $V_E$ and $V_N$ represent velocity components due east and due north, respectively. Since a value of the velocity component may be a positive value or a negative value, signaling of 1 bit may be used to indicate positive and negative signs, for example, 0 indicates a positive sign and 1 indicates a negative sign. Several bits (for example, 6 bits) following the sign-indicating bit may indicate a value of the velocity component. The traveling velocity and the traveling direction may be obtained, for example, based on a measurement of Global Positioning System (GPS).

Next, in step S2, the base station allocates scheduling information to the source device. Specifically, the base station issues the scheduling information of the source device for example in a physical downlink control channel PDCCH format 0 upon receiving a request for the road safety information broadcast (and the BRS) reported by the source device, and the base station may allocate, for example, three sections of resources to the source device based on one request from the source device (for example, the base station schedules three sections of resources by feeding-back three PDCCHs corresponding to one scheduling request from a user equipment): a resource for broadcasting the limited discovery information, a resource for reporting information to the base station, and a resource for broadcasting the road safety information. An interval between every two successive sections of the three sections of resources in a time domain is for example T ms. The source device broadcasts a limited discovery signal, reports the road safety information to the base station, and broadcasts the road safety information respectively by using the three sections of resources.

Next, in step S3, the source device broadcasts the limited discovery information. Specifically, the source device broadcasts a limited discovery signal using the resource for broadcasting the limited discovery information upon receiving the scheduling information from the base station. In this scenario, the limited discovery information includes, for example, a traveling velocity and a traveling direction of the source device and an ID of the road safety information.

Then, the source device may report a request for a relevant parameter of the limited discovery of road safety broadcast to the base station. In an example, the base station may determine a geographical position of the source device based on a positioning reference signal or other conventional ways, and reported content includes the same content as the broadcasted limited discovery information. In some optional embodiments, the content reported to the base station by the source device may further include position information of the source device measured based on GPS.

Next, in step S4, a vehicle receiving the broadcasted information makes a limited discovery decision (a limited discovery decision 1 in FIG. 15). For example, the vehicle periodically monitors the limited discovery information of surrounding vehicles, and makes the limited discovery decision based on the traveling velocity and the traveling direction of the source device included in the limited discovery information of the source device upon receiving the limited discovery information. In an example, in a two-way lane, the road safety information of the source device is only directed to vehicles having the same traveling directions as the source device, so the vehicles satisfying the condition need to receive the road safety information broadcasted by the source device. In some other examples, the road safety information of the source device may be only directed to vehicles having opposite traveling directions as the source device. For example, the source device discovers a traffic accident in an opposite lane and can achieve rapid long-distance propagation by broadcasting the event. In a case where both the above cases are possible, a relationship between an action direction of the road safety information and a traveling direction may be indicated by, for example, specific propagation direction indication information. For example, information of 1 bit is added to the limited discovery information to indicate the action direction of information. For another example, a vehicle receiving the limited discovery information may determine a relationship between the action direction of the road safety information and the traveling direction based on an ID of the road safety information (for example, a road safety event corresponding to an ID of a road safety information and an action direction of a road safety information or the like are stored in a memory in advance, and may be determined by reading the pre-stored content).

Considering that directions of two co-directional vehicles positioned by the GPS may have some slight deviations in an actual traveling process, whether the vehicles satisfy a direction requirement may be determined by determining whether an angle between traveling directions of the vehicles is within a predetermined range (for example, ±15°).

Vehicles satisfying the decision condition become candidate devices, and the candidate devices may transmit traveling velocities, traveling directions and position information (the position information may be measured by an in-vehicle GPS and reported, or may be automatically measured by the base station) to a serving base station end of the source device.

Next, in step S5, the serving base station of the source device monitors and issues information on a frequency point for monitoring the broadcast information.

Upon receiving a parameter reported by a candidate device, the serving base station of the source device performs limited detection to further determine whether the candidate device reporting the parameter satisfy a limited condition in S4. At this time, the base station may further perform decision for other limited conditions. For example, the road safety information broadcasted by the source device may be only affect vehicles in the front of or at the rear of the source device (for example, vehicle rear-end collision only affects the vehicles at the rear, only the vehicles in the front are affected when the source device transmits information requesting avoidance for a rescue vehicle), so the base station may perform further limited discovery based on specific information broadcasted from the source device, that is, limited discovery decision 2 in FIG. 15.

The base station may, for example, calculate the following equation:

$$g(v \cdot \Delta L_i) = \begin{cases} 1 & v \cdot \Delta L_i > 0 \\ 0 & v \cdot \Delta L_i \le 0 \end{cases}$$

and make further limited decision in combination with $g(v \cdot \Delta L_i)$ and the type of the road safety information.

where v represents a velocity of the source device, and $\Delta L_i$ represents a position vector of an i-th candidate device relative to the source device.

The scenario in the solution is used for road safety information, and the road safety information usually only affects vehicles at a certain position relative to a broadcast source: vehicles in the front of the broadcast source (in a case such as information requesting avoidance) or vehicles at the rear of the broadcast source (in a case such as vehicle fault information). The information type is defined according to a property of broadcast, for example, information of 1 bit is used for indication, where 0 indicates that the road safety information acts on the vehicles in the front, and 1 indicates that the road safety information acts on the vehicles at the rear.

If a decision result is 0, it indicates that the candidate device does not satisfy a relative positional relationship required by the information. If the decision result is 1, it indicates that the candidate device needs to monitor and receive the road safety information.

After determining a candidate device that satisfies the limited condition, that is, the target device, the base station may inform the target device of a time-frequency resource for broadcasting the road safety information.

Next, in step S6, the source device broadcasts the road safety information over the resource allocated by the base station. If allowed by the source device, the source device may also directionally transmit the road safety information with a beamforming technology in conjunction with a specific action range of the road safety information. Specifically, for example, after the above two limited decisions are completed, if the source device allows the use the beamforming technology, a control terminal may transmit a specific beamforming parameter to the source device. Alternatively, beamforming parameters for different safety events may be pre-appointed, the source device may determine a beamforming parameter based on a specific safety event, thereby achieving the beamforming more efficiently. In particular, in a super dense scenario, if two adjacent sources trigger broadcasts of different road safety information and the road safety information is directed to different regions, the above-mentioned manner facilitates frequency reuse of neighboring vehicles, thereby mitigating a problem of frequency resource shortage, and improving spectrum utilization.

Next, in step S7, the target device receives the road safety information broadcasted by the source device, and may, for example, control a traveling strategy such as a route, a velocity of the vehicle using the road safety information. In an example of the present disclosure, the target device may also store the relevant information in a buffer. In this case, a buffer time threshold needs to be pre-defined and the buffer may be released if no relevant indication of the base station is received within the time threshold.

Next, in step S8, the base station selects a relay node to forward the road safety information.

In the process of broadcasting the road safety information, in order to extend the coverage of the information, the message may be relayed and forwarded, and the relay node is selected by the base station. Optional relay nodes include the candidate devices and roadside devices. It should be noted that the road safety information may also be broadcasted by the base station. In the case that the road safety information is broadcasted by the base station, the source device may only trigger and report the information. Next, the functions of the source device are realized by the base station. In this case, it is not required to select the relay node, and the base station broadcasts the limited discovery information and the road safety information.

Next, exemplary sub-processes of selecting a relay node are illustrated.

Exemplary sub-process 1: an event type for triggering road safety information is determined. For example, road safety events may be classified as a static event (i.e., a geographical range affected by the event is stationary, such as a road collapse event) or a dynamic event (i.e., a geographical range affected by the event change dynamically, such as a vehicle brake failure) based on an event type for triggering the road safety information and an action direction thereof. In a case where a road safety event occurs is a static event, the base station may preferably select a roadside device in an influence range as a relay device for road safety information, and in a case where the road safety event is a dynamic event, the base station may preferably select a vehicle as a relay node.

Exemplary sub-process 2, selecting manner of a relay device. As described above, there may be multiple candidate devices which satisfy a limited discovery condition, that is, multiple target devices are selected. In this case, multiple target devices receive road safety information of the source device and store the road safety information in a buffer. Since parameters of these target devices are known on the base station side, and a resource required for relaying the road safety information is fixed and known by the base station, and a target device which serves as a relay device is selected by the base station, the relay device may omit the report process of the BSR, and determine whether a broadcast resource configured by the base station is received within a predefined time threshold after receiving the road safety information, perform relay broadcast if the broadcast resource configuration is received, and release the buffer if no broadcast resource configuration is received.

The base station may further select the relay vehicle selection based on relative velocities and distances of the vehicles satisfying the limited discovery condition relative to the source device. As described above, a priority may be determined based on relative velocities of the candidate devices relative to the source device and distances of the candidate devices from the source device, and a relay device is selected based on the determined priority.

In the case where the base station selects a candidate device having a highest priority, the candidate device is notified of a resource for broadcasting the limited discovery information and a resource for broadcasting the road safety information with downlink control information DCI format 0 in the PDCCH. In this case, transmission of the DCI format 0 may be improved as compared with the conventional scheduling information, and an optional improvement manner includes for example:

1-bit information is added to the DCI format 0 to indicate that the currently allocated resource is used for broadcasting. According to a third generation partnership project technical specification 3GPP TS 36.321, there are a number of different radio network temporary identifiers RNTIs in the long term evolution LTE system, which are denoted as X-RNTI. Each RNTI occupies 16 bits. The base station may scramble the DCI format using different RNTIs, and the user equipment end may determine use of a resource indicated in the DCI using blind detection for the RNTI. The above notification can be realized using a value of the occupied RNTI.

When a vehicle accesses to the network, a B-RNTI for a broadcast operation is allocated to the vehicle. The value of the B-RNTI can be allocated from 0001 to FFFC in hexadecimal format. The base station scrambles the DCI Format 0 using the B-RNTI corresponding to the target device. In a case that the target device can blind-detect the DCI Format 0 successfully using the B-RNTI, it may know that the current resource is allocated for the broadcast operation.

Exemplary sub-process 3, an alternative selection manner for candidate relay device An example where a vehicle is preferably selected as a relay node and a roadside device serves as a substitution: when the source device triggers to broadcast road safety information due to a dynamic event, there may be no candidate device that satisfies the limited discovery condition within a communication range of the source device if the source device is located on a road where vehicles are distributed sparsely. In this case, the base station may select a roadside device on the front or at the rear of the source device as a relay node for the road safety information based on an influence direction of the current road safety information.

An example in which a roadside device is preferably selected as a relay node and a vehicle serves as substitution: if the roadside device cannot cover a certain road section seamlessly, in order to inform all vehicles traveling on the road of certain road safety information, a virtual traveling velocity may be assigned to the roadside device. The traveling velocity has a value equal to an average traveling velocity of vehicles in the road section, and has a direction of a traveling lane related to the road safety information (for example, traveling directions 1 or 2 in FIG. 14). Thus a candidate device is selected to notify the broadcast outside the coverage of the roadside device. The candidate device is selected in a mode same as the mode in which the source device selects a relay node.

In the exemplary embodiment described above, in a case where the source device is located within the coverage of the base station, the base station determines a target device that directly communicates with the source device. In a case where the source device is outside the coverage of the base station, the source device may determine the target device. Next, a configuration example of a wireless communication device 400 according to an embodiment is described with reference to FIG. 4. In the embodiment, the wireless communication device 400 is the source device itself described above.

Figure 4:
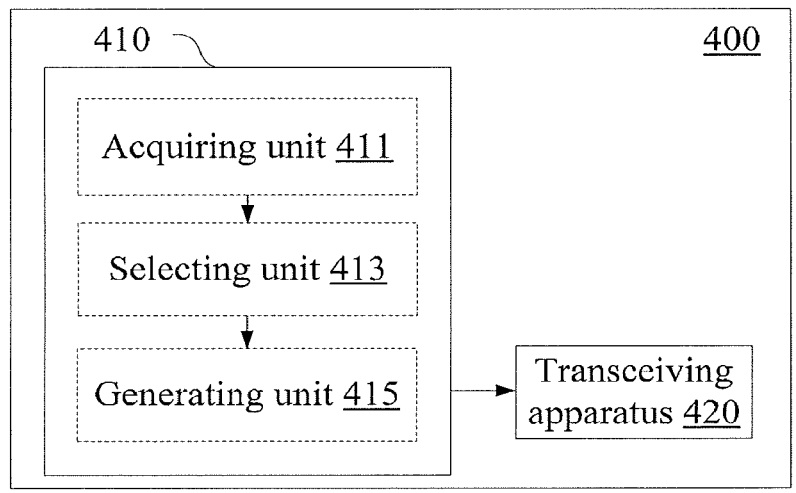
FIG. 4 is a block diagram showing a configuration example of a user equipment as another exemplary embodiment of a wireless communication device.

As shown in FIG. 4, the wireless communication device 400 according to the embodiment includes a processor 410 and a transceiving apparatus 420. The processor includes an acquiring unit 411, a selecting unit 413 and a generating unit 415. Configurations of the acquiring unit 411, the selecting unit 413 and the generating unit 415 are similar to those of the acquiring unit 111, the selecting unit 113 and the generating unit 115 described above with reference to FIG. 1.

The transceiving apparatus 420 is configured to transmit a discovery signal and receive a response signal. The discovery signal includes an identifier of the source device (i.e., the communication device 400) and auxiliary information on propagation limitation, and the response signal includes information on an identifier, a position and a motion direction of a candidate device.

In addition, in a case where the transceiving apparatus 420 includes multiple antennas, the processor 410 may further include a second generating unit (not shown in the figure), which may generate weighting coefficients of a signal to be transmitted at the antennas based on a position of a target device, to perform directional direct communication with the target device via the transceiving apparatus 410. For example, the weighting coefficients of the antennas may be determined such that a main lobe of a beam covers the multiple target devices, alternatively, after a relay node is selected, beam forming is performed on the relay node.

Next, a specific example of an embodiment in which a target device is selected by the source device is described with reference to FIG. 16 and FIG. 17. In this example, the source device is a vehicle, the candidate devices are vehicles or roadside devices, and the information to be propagated is road safety information. However, it should be understood that some aspects of the following examples are also be applied to other application scenarios.

Figure 16:
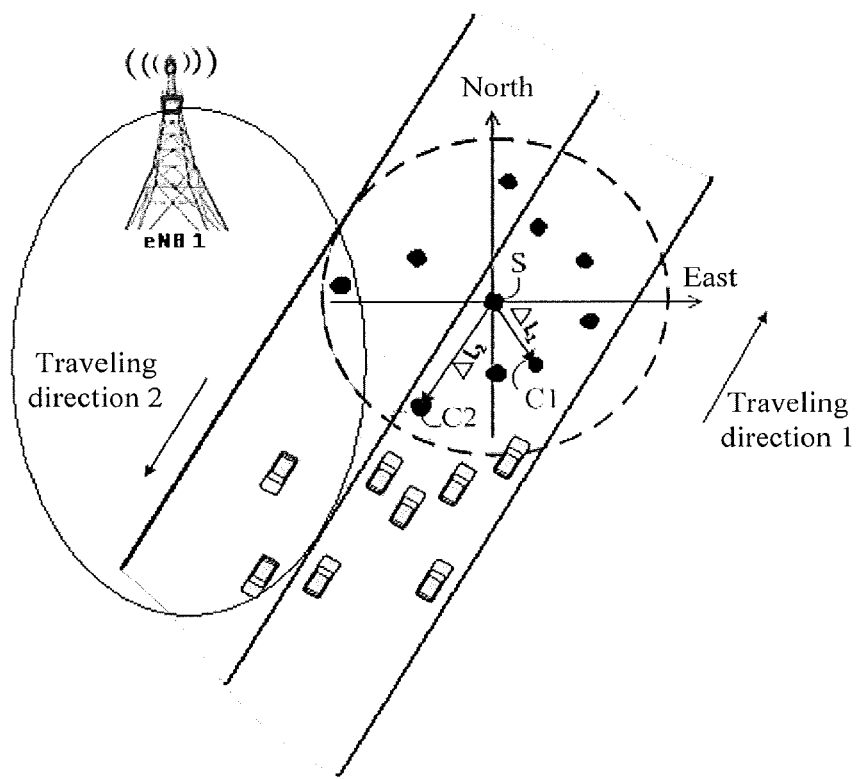
FIG. 16 is a schematic diagram showing a V2V communication scenario as another application example according to an embodiment of the present disclosure.
Figure 17:
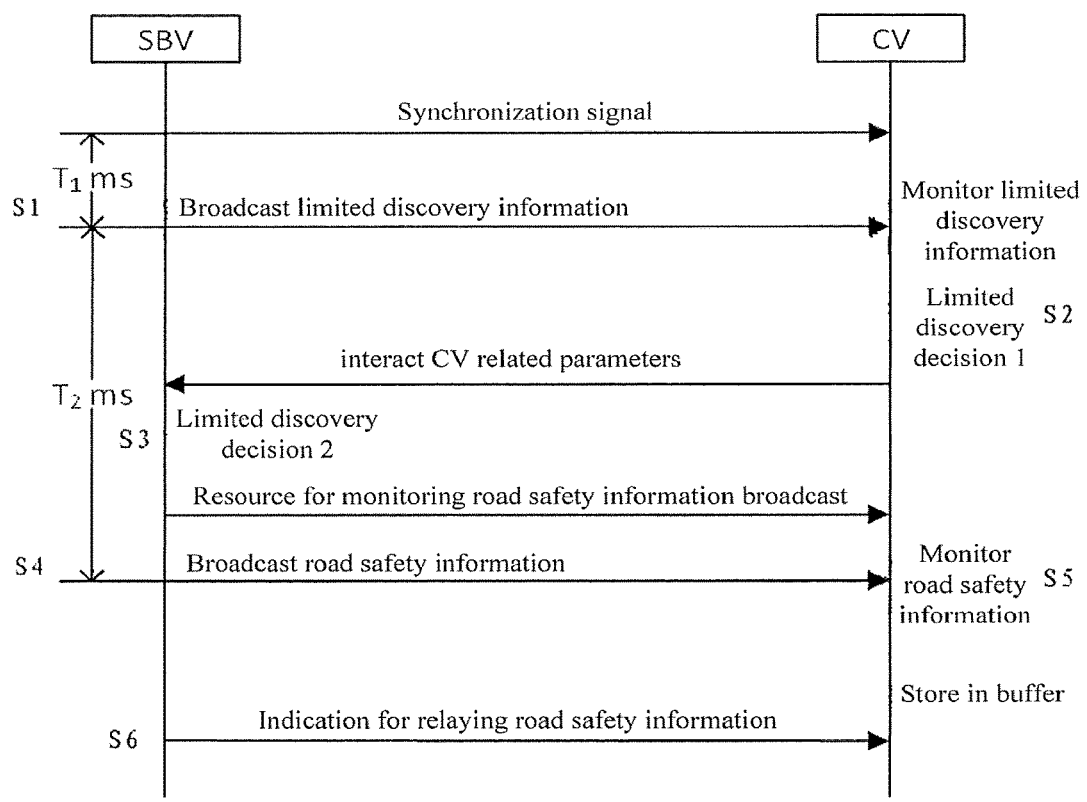
FIG. 17 is a flowchart showing an exemplary communication process of a V2V communication scenario as another application example according to an embodiment of the present disclosure.

As shown in the schematic diagram of FIG. 16, a part of the vehicles in FIG. 16 travel on a lane corresponding to a traveling direction 1 in the traveling direction 1, and the other part of the vehicles travel on a lane corresponding to a traveling direction 2 in the traveling direction 2. A source device S is located outside the coverage of a base station eNB1, and a dotted line in FIG. 16 represents a broadcast signal coverage of the source device S, and a vehicle in the broadcast signal coverage of the source device S is denoted as a dot. As exemplary candidate devices, candidate devices C1 and C2 are also located outside the coverage of the base station eNB1.

In this example, the road safety information is broadcasted outside the coverage of the base station. In V2X road safety information broadcast without assistance of a base station, a communication resource to be used may be selected from a resource pool. Next, an exemplary process is described in further detail with reference to FIG. 17.

In step S1, the source device broadcasts a synchronization signal and a limited discovery signal.

In a scenario without the coverage of a cellular network, before broadcasting the road safety information, the source device transmits a synchronization signal, and transmits a limited discovery signal in a specific monitoring band after a certain time interval (for example, T1 ms) from the time of transmitting the synchronization signal. The content of the limited discovery signal may be similar to that in the example described above with reference to FIG. 14 and FIG. 15. The time interval may be pre-appointed between vehicles or between a vehicle and a roadside device (for example, the time interval is determined according to a communication protocol).

Next, in step S2, other vehicles receive the limited discovery signal and make limited decisions.

The vehicles perform a process similar to the limited discovery decision 1 described above with reference to FIG. 15 based on the received limited discovery information. A vehicle satisfying a decision condition serves as a candidate device, and reports information on a velocity and a position of the candidate device to the source device.

Next, in step S3, the source device issues information on a receiving frequency point for road safety information.

Upon receiving information on the velocity and the position information reported by the candidate device, the source device performs a process similar to the limited discovery decision 2 described above with reference to FIG. 15. In addition, the source device may also perform another limited discovery decision, for example, a further limited decision that is similar to the further limited decision performed in combination with $g(v \cdot \Delta L_i)$ and the type of the road safety information is performed in conjunction with an action scope of the road safety information, and a candidate device (a selected target device) that eventually satisfies the condition is notified of a time-frequency resource block occupied for broadcasting the road safety information (the resource block is selected, for example, from a resource pool by the source device).

Next, in step S4, the source device broadcasts the road safety information.

The source device may broadcast the road safety information over the selected resource. As described above, the road safety information may be transmitted directionally in conjunction with a specific influence range of the road safety information with beamforming technology, if allowed by the source device.

Next, in step S5, the target device receives the road safety information.

Upon receiving the road safety information from the source device, the target device may store the road safety information in a buffer, and the buffer may be released if no relay indication of the source device is received within a predefined time threshold.

Next, in step S6, the source device selects a relay node.

When the coverage of the source device cannot meet a predetermined coverage of the road safety information, the source device may select an appropriate target device as a forwarding relay node for the target safety information. A relay node may be selected based on a priority with a method similar to a selection method based on a priority described above, and a target device having a highest priority is selected as the relay node. After selecting the relay node, the source device may establish unicast communication with the selected target device, to indicate that the selected target device serves as a relay node.

In the foregoing description of the wireless communication device according to the embodiment of the present disclosure, apparently, some processes and methods are disclosed. In the following, a wireless communication method according to an embodiment of the present disclosure is described without repeating the details already described above.

Figure 5:
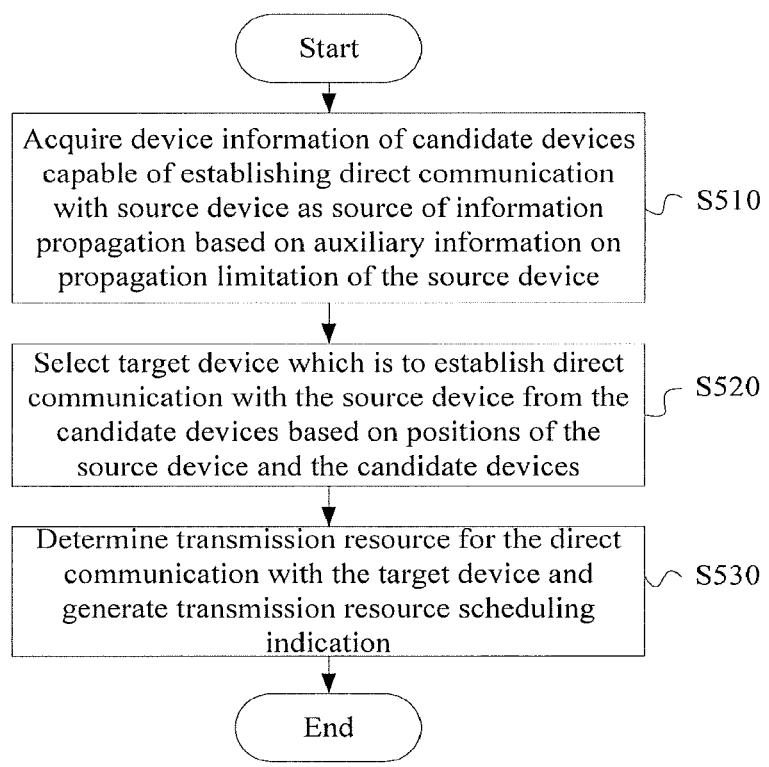
FIG. 5 is a flowchart showing a process example of a wireless communication method according to an embodiment of the present disclosure.

As shown in FIG. 5, a wireless communication method according to an embodiment includes: step S510 of acquiring, based on auxiliary information on propagation limitation of a source device as a source of information propagation, device information of candidate devices capable of establishing direct communication with the source device; step S520 of selecting, based on positions of the source device and the candidate devices, a target device which is to establish direct communication with the source device from the candidate devices; and step S530 of determining a transmission resource for the direct communication with the target device and generating a transmission resource scheduling indication.

The wireless communication method according to the embodiment is used for determining a target device which is to establish direct communication with a source device as a source of information propagation and scheduling a transmission resource for the direct communication. The method is executed by a control terminal for the direct communication. As described above in conjunction with the embodiments, the control terminal may be a serving base station of the source device or the source device itself. In other words, the wireless communication method according to the embodiment may be performed by a base station or a user equipment.

Devices as two communication parties of the direct communication may include various user equipments having a wireless communication function. In an application scenario of direct communication involving a vehicle, the following situations may be included: the source device is a vehicle while the target device is a vehicle; the source device is a vehicle while the target device is a related entity (such as a roadside device); and the source device is a related entity (such as a roadside device) while the target device is a vehicle.

Embodiments of the device and the method on the base station side and on the source device side are described above. Next, an embodiment of a device and a method on a candidate device side is described.

Figure 6:
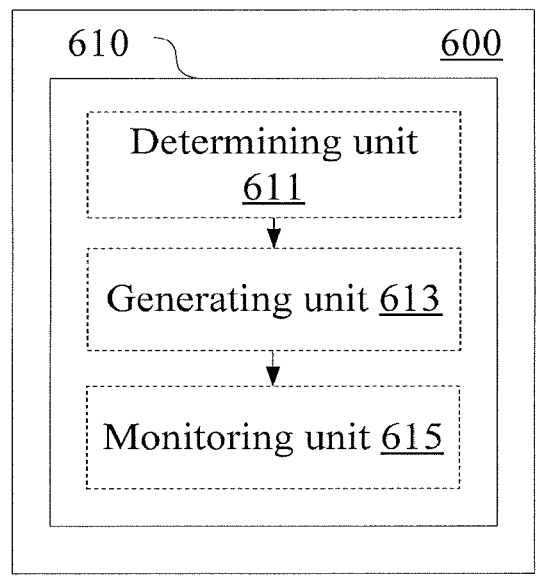
FIG. 6 is a block diagram showing a configuration example of a wireless communication device according to an embodiment of the present disclosure.

As shown in FIG. 6, a wireless communication device 600 according to the embodiment includes a processor 610. The processor 610 includes a determining unit 611, a generating unit 613, and a monitoring unit 615.

The determining unit 611 is configured to determine, based on auxiliary information on propagation limitation contained in a discovery signal from a source device as a source of information propagation, whether to serve as a candidate device capable of establishing direct communication with the source device.

According to an embodiment, the determining unit 611 determines that the wireless communication device 600 serves as a candidate device in a case where the wireless communication device 600 satisfies one or more of the following conditions: the wireless communication device 600 is located in an information propagation direction with respect to the source device; and the wireless communication device 600 has a motion direction same as the source device.

The generating unit 613 is configured to generate a response signal in a case where the determining unit 611 determines that the wireless communication device 600 serves as a candidate device, and the response signal includes device information of the wireless communication device 600.

The monitoring unit 615 monitors a transmission resource scheduling indication for the direct communication to acquire a transmission resource. The acquisition of the transmission resource for the direct communication with the source device is related to a position of the wireless communication device 600.

For example, the base station or the source device determines whether the wireless communication device 600 is selected as a target device which is to establish direct communication with the source device based on the device information in the response signal transmitted from the wireless communication device 600. When the wireless communication device 600 is selected as the target device, a transmission resource for the direct communication with the source device is provided to the wireless communication device 600.

The process of determining whether the wireless communication device 600 serves as the target device by the determining unit 611 and the process of determining whether the wireless communication device 600 is selected as the target device by the base station or source device may be performed in the manner adopted in the embodiment described above, and are not repeated here.

Figure 7:
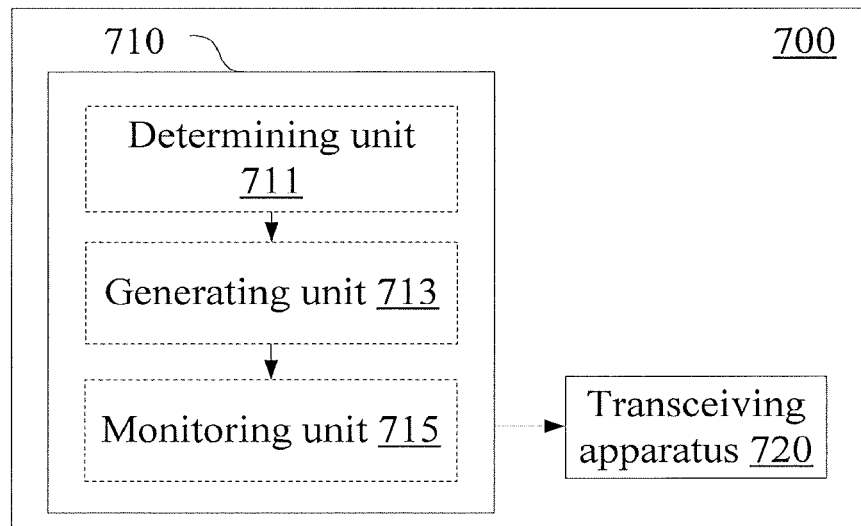
FIG. 7 is a block diagram showing a configuration example of a wireless communication device according to another embodiment.

FIG. 7 shows a configuration example of a wireless communication device according to another embodiment. A wireless communication device 700 according to the embodiment includes a processor 710 and a transceiving apparatus 720.

The processor 710 includes a determining unit 711, a generating unit 713 and a monitoring unit 715, which are configured similarly to the determining unit 611, the generating unit 613 and the monitoring unit 615.

The transceiving apparatus 720 is configured to receive a discovery signal from a source device, and is further configured to transmit a response signal to the source device, a serving base station of the source device or a serving base station of the wireless communication device. For example, in the case where the target device is determined by the source device, the transceiving apparatus 720 may transmit a response signal to the source device; in the case where the target device is determined by the serving base station of the source device, and the source device and the wireless communication device 700 correspond to the same serving base station, the transceiving apparatus 720 may transmit a response signal to the serving base station of the source device; and in the case where the target device is determined by the serving base station of the source device, and the source device and the wireless communication device 700 correspond to different serving base stations, the transceiving apparatus 720 may transmit a response signal to a serving base station of the wireless communication device 700, and the information can be forwarded between the base stations, for example, via an X2 interface.

In addition, in a case where the wireless communication device 700 is selected as a relay node for the information propagation of the source device, the transceiving apparatus 720 may be further configured to relay the information propagation of the source device.

As described above, information propagated from the source device may include road safety information, and accordingly, the wireless communication device 700 may be, for example, a vehicle or a roadside device.

Next, a wireless communication method performed on a candidate device side according to an embodiment is described with reference to FIG. 8 without repeating the details already described above.

Figure 8:
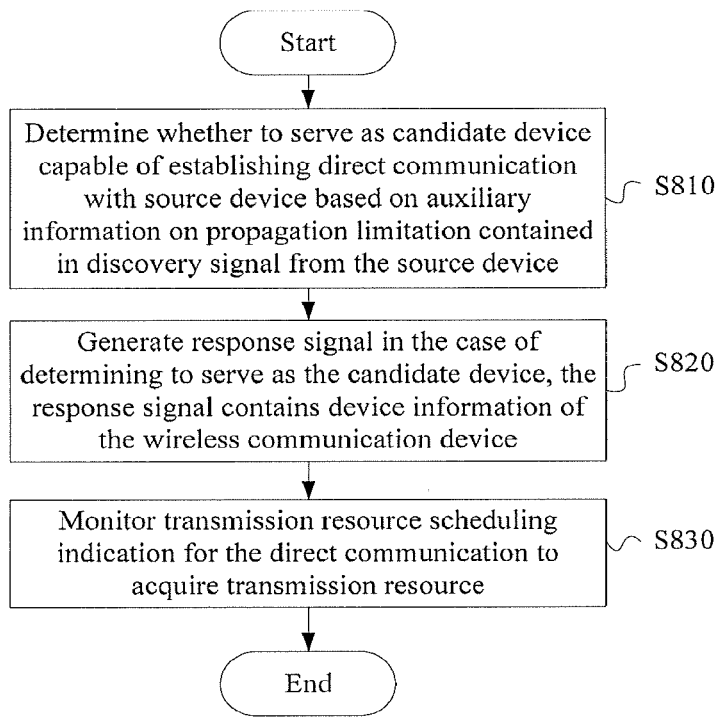
FIG. 8 is a flowchart showing a process example of a wireless communication method according to an embodiment of the present disclosure.

As shown in FIG. 8, a wireless communication method according to the embodiment includes: step S810 of determining, based on auxiliary information on propagation limitation included in a discovery signal from a source device as a source of information propagation, whether to serve as a candidate device capable of establishing direct communication with the source device; step S820 of generating a response signal in a case of determining to serve as the candidate device, the response signal including device information of the wireless communication device; and step S830 of monitoring a transmission resource scheduling indication for the direct communication to acquire a transmission resource. The acquisition of the transmission resource for the direct communication with the source device is related to a position of the wireless communication device.

Figure 9:
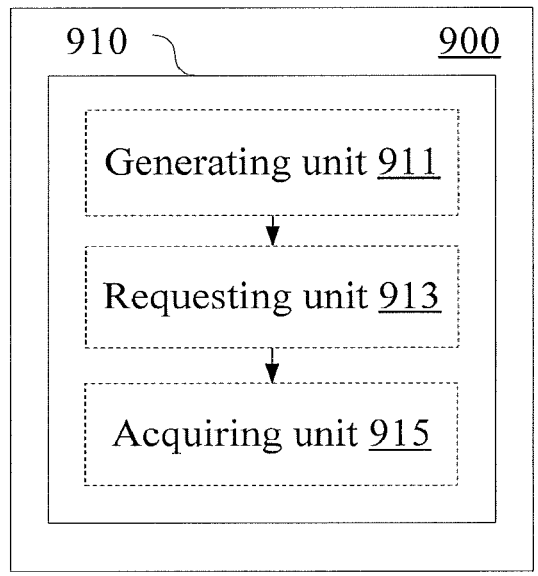
FIG. 9 is a block diagram showing a configuration example of a wireless communication device according to an embodiment of the present disclosure.

FIG. 9 shows a configuration example of a wireless communication device serving as a source device in an application of road safety information according to an embodiment of the present disclosure. The wireless communication device may be, for example, a vehicle or a roadside device. As shown in FIG. 9, a wireless communication device 900 includes a processor 910, and the processor 910 includes a generating unit 911, a requesting unit 913 and an acquiring unit 915.

The generating unit 911 is configured to generate road safety information in response to a road safety event.

The requesting unit 913 is configured to generate a resource scheduling request for the serving base station to transmit the road safety information.

The acquiring unit 915 is configured to acquire transmission resources for a discovery signal and a broadcast signal related to road safety information, respectively, corresponding to the resource scheduling request. Since one resource scheduling request is used to acquire the transmission resources for the discovery signal and the broadcast signal, respectively, one resource scheduling request corresponds to at least two PDCCHs indicating the transmission resources.

Figure 18:
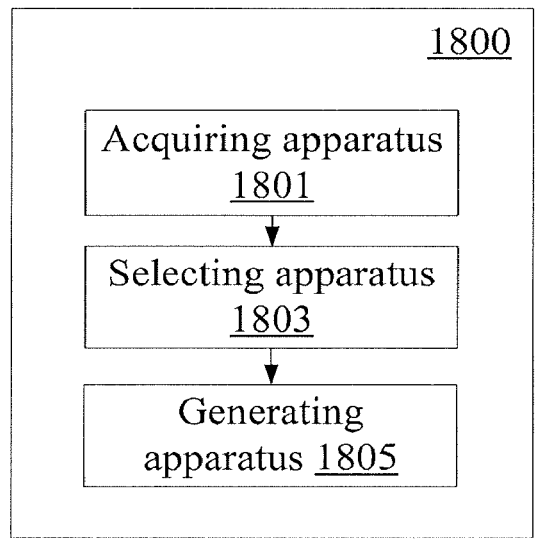
FIG. 18 is a block diagram showing a configuration example of a wireless communication device according to an embodiment of the present disclosure.
Figure 19:
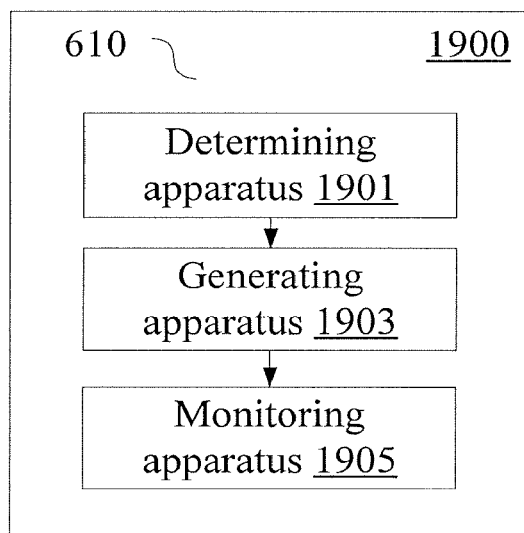
FIG. 19 is a block diagram showing a configuration example of a wireless communication device according to another embodiment of the present disclosure.
Figure 20:
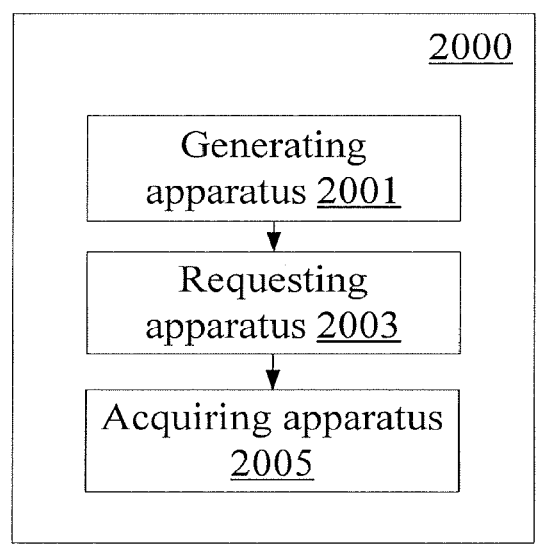
FIG. 20 is a block diagram showing a configuration example of a wireless communication device according to yet another embodiment of the present disclosure.

Furthermore, FIG. 18 to FIG. 20 show configuration examples of wireless communication devices according to embodiments of the present disclosure, respectively.

As shown in FIG. 18, a wireless communication device 1800 according to an embodiment includes an acquiring apparatus 1801, a selecting apparatus 1803 and a generating apparatus 1805. The acquiring apparatus 1801 is configured to acquire, based on auxiliary information on propagation limitation of a source device as a source of information propagation, device information of candidate devices capable of establishing direct communication with the source device. The selecting apparatus 1803 is configured to select, from the candidate devices, a target device which is to establish direct communication with the source device based on positions of the source device and the candidate devices. The generating apparatus 1805 is configured to determine a transmission resource for the direct communication with the target device and generate a transmission resource scheduling indication.

As shown in FIG. 19, a wireless communication device 1900 according to another embodiment includes a determining apparatus 1901, a generating apparatus 1903, and a monitoring apparatus 1905. The determining apparatus 1901 is configured to determine, based on auxiliary information on propagation limitation included in a discovery signal from a source device as a source of information propagation, whether to serve as a candidate device capable of establish direct communication with the source device. The generating apparatus 1903 is configured to generate a response signal in a case where the wireless communication device 1900 is determined to serve as the candidate device, wherein the response signal contains device information of the wireless communication device. The monitoring apparatus 1905 is configured to monitor a transmission resource scheduling indication for the direct communication to acquire a transmission resource. The acquisition of the transmission resource for the direct communication with the source device is related to a position of the wireless communication device.

As shown in FIG. 20, a wireless communication device 2000 according to another embodiment includes a generating apparatus 2001, a requesting apparatus 2003, and an acquiring apparatus 2005. The generating apparatus 2001 is configured to generate road safety information in response to a road safety event. The requesting apparatus 2003 is configured to generate a resource scheduling request for a serving base station to transmit the road safety information. The acquiring apparatus 2005 is configured to acquire transmission resources for a discovery signal and a broadcast signal related to road safety information, respectively, corresponding to the resource scheduling request.

As an example, steps of the above methods and modules and/or units of the above devices may be implemented with software, firmware, hardware or a combination thereof. In a case of implementing with software or firmware, programs consisting of the software for implementing the methods above are installed to a computer having a dedicated hardware structure (for example a general-purpose computer 1000 shown in FIG. 10) from a storage medium or a network. The computer can perform various functions when being installed with various programs.

Figure 10:
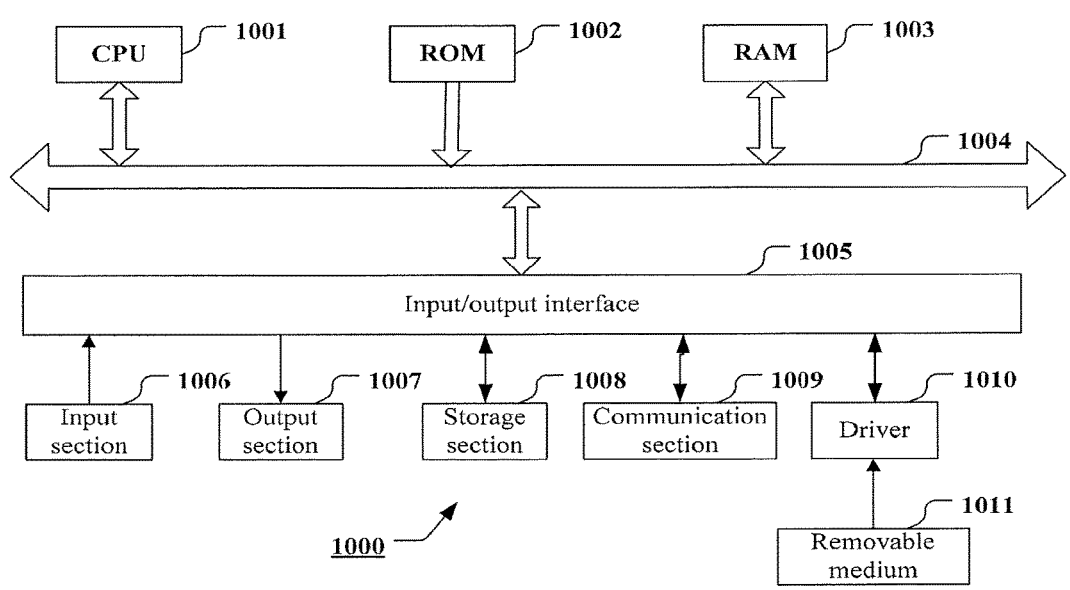
FIG. 10 is a block diagram showing an exemplary structure of a computer for implementing the method and the device of the present disclosure.

In FIG. 10, a central processing unit (CPU) 1001 performs various processing according to programs stored in a read only memory (ROM) 1002 or programs loaded from a storage section 1008 to a random access memory (RAM) 1003. Data required when the CPU 1001 performs various processing is also stored in the RAM 1003 as needed. The CPU 1001, the ROM 1002 and the RAM 1003 are linked to each other via a bus 1004. An input/output interface 1005 is also linked to the bus 1004.

The following components are linked to the input/output interface 1005: an input section 1006 (including a keyboard, and a mouse and so on), an output section 1007 (including a display, for example a cathode ray tube (CRT) and a liquid crystal display (LCD), and a loudspeaker), a storage section 1008 (including a hard disk and so on), and a communication section 1009 (including a network interface card such as a LAN card, and a modem). The communication section 1009 performs communication processing via a network for example the Internet. A driver 1010 may also be linked to the input/output interface 1005 as needed. A removable medium 1011 for example a magnetic disk, an optical disk, a magnetic-optical disk and a semiconductor memory may be installed on the driver 1010 as needed, such that computer programs read from the removable medium 1011 are installed on the storage section 1008 as needed.

In a case of the series of processing described above are realized with software, programs consisting of the software are installed from the network for example the Internet or the storage medium for example the removable medium 1011.

Those skilled in the art should understand that the storage medium is not limited to the removable medium 1011 shown in FIG. 10 which stores programs therein and is distributed separately from the device to provide the programs to the user. The removable medium 1011 include for example a magnetic disk (including a floppy disk (registered trademark), an optical disk (including a compact disk read only memory (CD-ROM) and a digital versatile disk (DVD), a magnetic-optical disk (including a mini disk (MD) (registered trademark)), and a semiconductor memory. Alternatively, the storage medium may be the ROM 1002, a hard disk included in and the storage section 1008 and the like, which stores programs therein, and is distributed to the user along with the device containing it.

A program product having machine readable instruction codes stored therein is further provided according to the embodiments of the present disclosure. When read and executed by a machine, the instruction codes cause the machine to perform the method according to the embodiment of the present disclosure.

Accordingly, a storage medium for carrying the program product having the machine readable instruction codes stored therein is also included in the present disclosure. The storage medium includes but is not limited to a floppy disk, an optical disk, a magnetic-optical disk, a storage card and a memory stick and so on.

The embodiments of the present disclosure further relate to an electronic device as follows. In a case where the electronic device is used on a side of a base station, the electronic device may be implemented as any type of evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base stations, such as a NodeB and a base transceiver station (BTS). The electronic device may include: a main body (also referred to as a base station device) configured to control wireless communication; and one or more remote radio heads (RRH) located at positions different from the main body. In addition, various types of terminals described below each may operate as a base station by temporarily or semi-persistently performing functions of the base station.

In a case where the electronic device is used on a side of a user equipment, the electronic device may be implemented as mobile terminals (such as a smart phone, a tablet personal computer (PC), a notebook PC, a portable game terminal, a portable/dongle mobile router and a digital camera) or an in-vehicle terminal (such as a car navigation device). In addition, the electronic device may be a wireless communication module (such as an integrated circuit module including one or more wafers) installed on each of the above terminals.

[Application Example Regarding Terminal Device]

Figure 11:
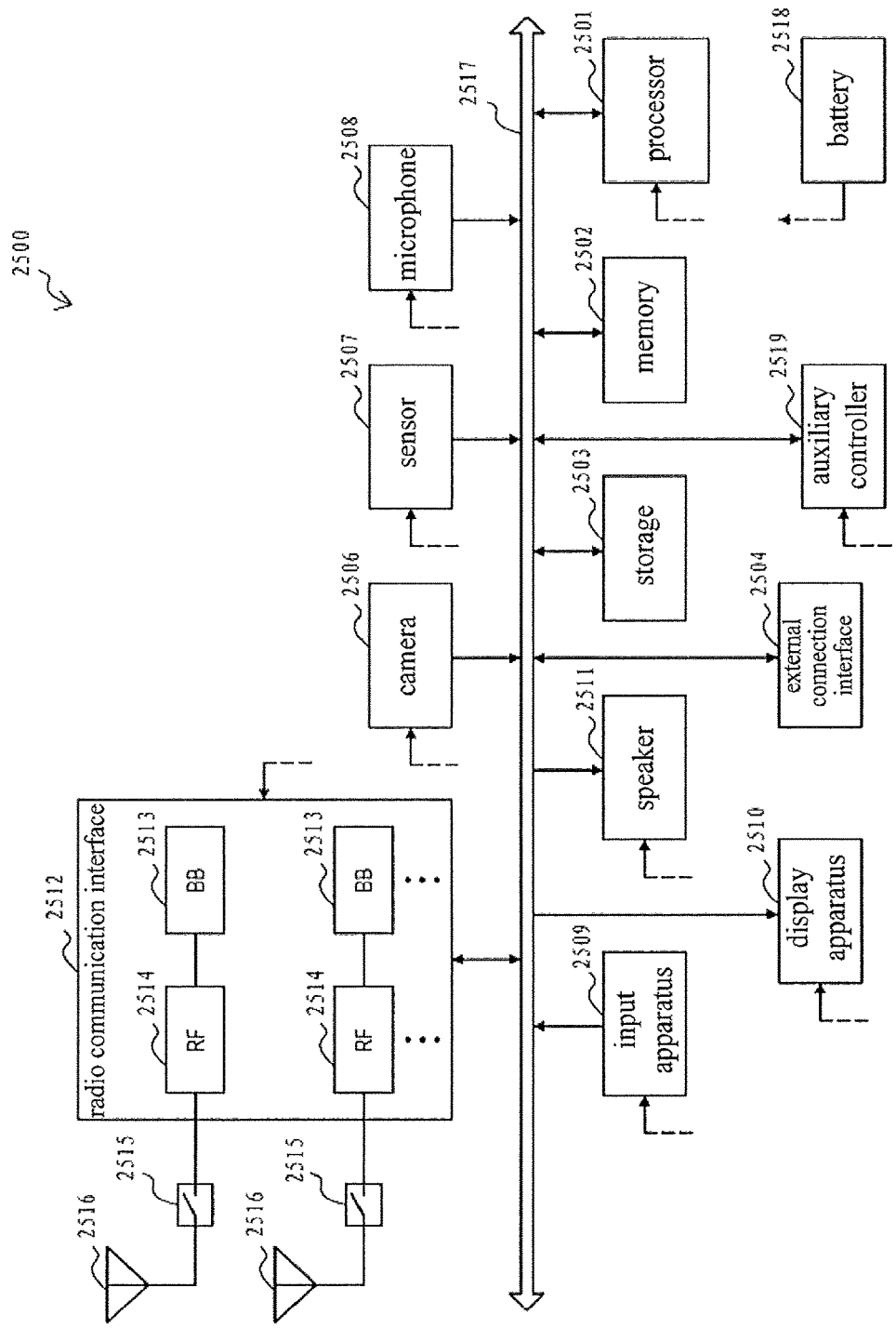
FIG. 11 is a block diagram showing an example of a schematic configuration of a smartphone to which the technology of the present disclosure may be applied.

FIG. 11 is a block diagram illustrating an example of a schematic configuration of a smart phone 2500 to which the technology of the present disclosure may be applied. The smart phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes a RAM and a ROM, and stores a program that is executed by the processor 2501 and data. The storage 2503 may include a storage medium such as a semiconductor memory and a hard disk. The external connection interface 2504 is an interface for connecting an external apparatus (such as a storage card and a universal serial bus (USB) apparatus) to the smart phone 2500.

The camera 2506 includes an image sensor (such as a charge coupled device (CCD) and a complementary metal oxide semiconductor (CMOS)), and generates a captured image. The sensor 2507 may include a set of sensors such as a measurement sensor, a gyro sensor, a geomagnetic sensor, and an acceleration sensor. The microphone 2508 converts sound input to the smart phone 2500 to an audio signal. The input apparatus 2509 includes, for example, a touch sensor configured to detect touch onto a screen of the display apparatus 2510, a keypad, a keyboard, a button, or a switch, and receive an operation or information input from a user. The display apparatus 2510 includes a screen (such as a liquid crystal display (LCD) and an organic light-emitting diode (OLED) display), and displays an output image of the smart phone 2500. The speaker 2511 converts the audio signal that is output from the smart phone 2500 to sound.

The radio communication interface 2512 supports any cellular communication scheme (such as LTE and LTE-Advanced), and performs wireless communication. The radio communication interface 2512 may typically include, for example, a baseband (BB) processor 2513 and a radio frequency (RF) circuit 2514. The BB processor 2513 may perform, for example, encoding/decoding, modulating/demodulating, and multiplexing/demultiplexing, and performs various types of signal processing for wireless communication. Meanwhile, the RF circuit 2514 may include, for example, a mixer, a filter, and an amplifier, and transmits and receives wireless signals via the antenna 2516. The radio communication interface 2512 may be a chip module having the BB processor 2513 and the RF circuit 2514 integrated thereon. As shown in FIG. 11, the radio communication interface 2512 may include multiple BB processors 2513 and multiple RF circuits 2514. Although FIG. 11 shows the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to a cellular communication scheme, the radio communication interface 2512 may support another type of wireless communication scheme such as a short-distance wireless communication scheme, a near field communication scheme, and a wireless local area network (LAN) scheme. In this case, the radio communication interface 2512 may include the BB processor 2513 and the RF circuit 2514 for each wireless communication scheme.

Each of the antenna switches 2515 switches connection destinations of the antennas 2516 among multiple circuits (such as circuits for different wireless communication schemes) included in the radio communication interface 2512.

Each of the antennas 2516 includes a single or multiple antenna elements (such as multiple antenna elements included in an MIMO antenna), and is used for the radio communication interface 2512 to transmit and receive wireless signals. As shown in FIG. 11, the smart phone 2500 may include the multiple antennas 2516. Although FIG. 11 shows the example in which the smart phone 2500 includes the multiple antennas 2516, the smart phone 2500 may also include a single antenna 2516.

Furthermore, the smart phone 2500 may include the antenna 2516 for each wireless communication scheme. In this case, the antenna switches 2515 may be omitted from the configuration of the smart phone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 to each other. The battery 2518 supplies power to blocks of the smart phone 2500 shown in FIG. 11 via feeder lines, the feed lines are partially shown as dashed lines in FIG. 11. The auxiliary controller 2519 operates a minimum necessary function of the smart phone 2500, for example, in a sleep mode.

The transceiving apparatus 420 described with reference to FIG. 4 and the transceiving apparatus 720 described with reference to FIG. 7 can be implemented by the radio communication interface 2512 in the smart phone 2500 shown in FIG. 11. At least part of the functions of units described with reference to FIG. 1, FIG. 2, FIG. 4, FIG. 6, FIG. 7 and FIG. 9 may be implemented by the processor 2501 or the auxiliary controller 2519. For example, a part of the functions of the processor 2501 may be executed by the auxiliary controller 2519 to reduce power consumption of the battery 2518. In addition, the processor 2501 or the auxiliary controller 2519 may perform at least part of the functions of the units described with reference to FIG. 1, FIG. 2, FIG. 4, FIG. 6, FIG. 7 and FIG. 9 by executing programs stored in the memory 2502 or the storage 2503.

[Application Example Regarding Base Station]

Figure 12:
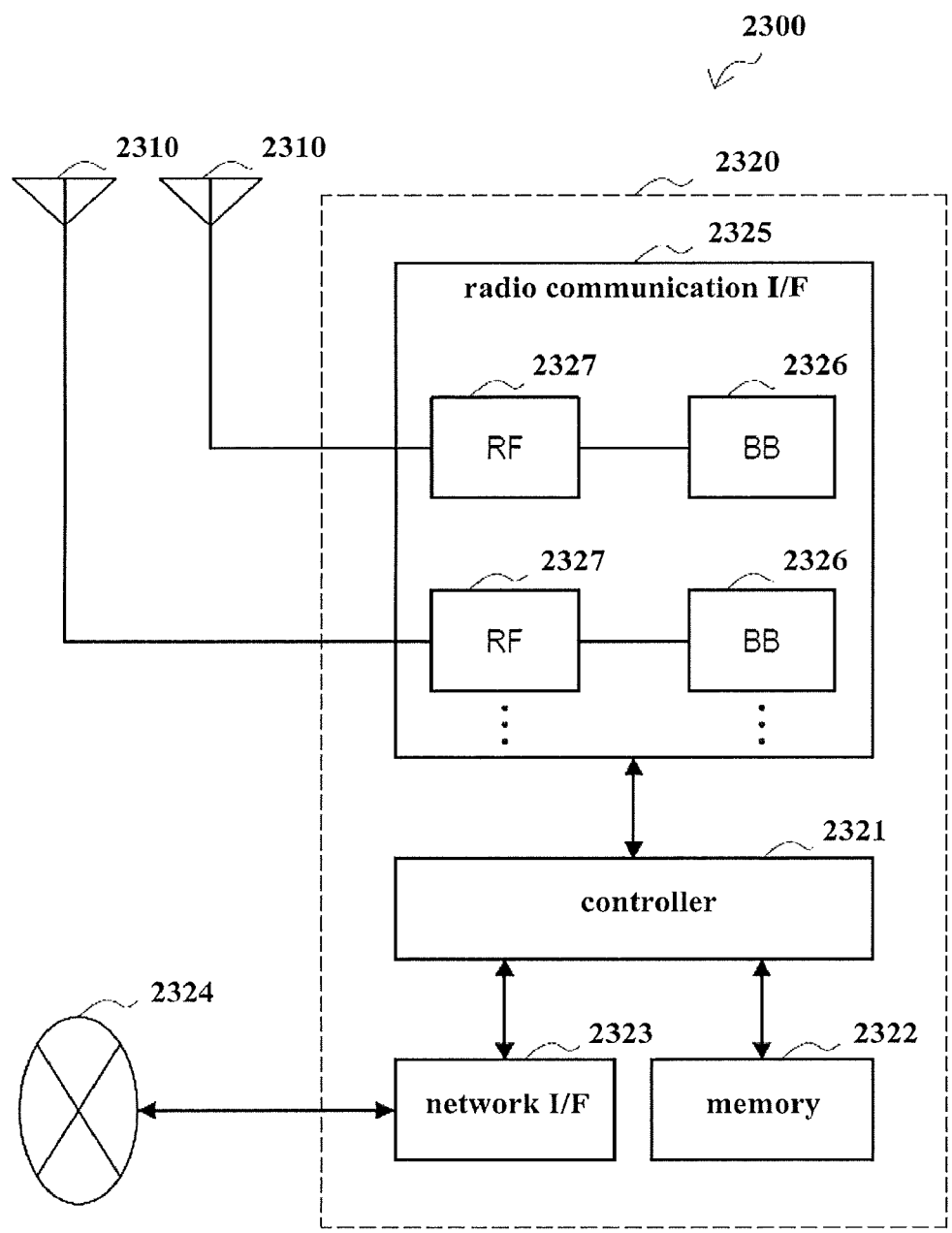
FIG. 12 is a block diagram showing an example of a schematic configuration of an eNodeB (eNB) to which the technology of the present disclosure may be applied.

FIG. 12 is a block diagram showing an example of a schematic configuration of an eNB to which the technology of the present disclosure may be applied. An eNB 2300 includes one or more antennas 2310 and a base station device 2320. The base station device 2320 and each of the antennas 2310 may be connected to each other via a radio frequency (RF) cable.

Each of the antennas 2310 includes one or more antenna elements (such as multiple antenna elements included in a multiple input multiple output (MIMO) antenna) and is used by the base station device 2320 to transmit and receive a wireless signal. As shown in FIG. 12, the eNB 2300 may include multiple antennas 2310. For example, the multiple antennas 2310 may be compatible with multiple frequency bands used by the eNB 2300. Although FIG. 12 shows the example in which the eNB2300 includes multiple antennas 2310, the eNB2300 may include a single antenna 2310.

The base station device 2320 includes a controller 2321, a memory 2322, a network interface 2323 and a radio communication interface 2325.

The controller 2321 may be for example a CPU or a DSP and control various functions of higher layers of the base station device 2320. For example, the controller 2321 generates a data packet based on data in a signal processed by the radio communication interface 2325, and transfers the generated packet via a network interface 2323. The controller 2321 may bind data from multiple baseband processors to generate a binding packet and transfer the generated binding packet. The controller 2321 may have logic functions for performing the following control: wireless resource control, wireless carrying control, mobility management, admission control and schedule. The control may be performed in combination with an adjacent eNB or a core network node. The memory 2322 includes a RAM and a ROM, and stores programs executed by the controller 2321 and various types of control data (such as a terminal list, transmission power data and scheduling data).

The network interface 2323 is a communication interface for connecting the base station device 2320 to the core network 2324. The controller 2321 may communication with the core network node or another eNB via the network interface 2323. In this case, the eNB 2300 and the core network node or another eNB may be connected to each other via a logic interface (such as an S1 interface or an X2 interface). The network interface 2323 may be a wired communication interface or a radio communication interface for a wireless backhaul line. If the network interface 2323 is a radio communication interface, the network interface 2323 may use a higher frequency band for wireless communication as compared with the frequency band used by the radio communication interface 2325.

The radio communication interface 2325 supports any cellular communication scheme (such as long term evolution (LTE) and LTE-advanced), and provides wireless connection to a terminal located in a cell of the eNB 2300 via an antenna 2310. The radio communication interface 2325 may generally include a baseband (BB) processor 2326 and an RF circuit 2327. The BB processor 2326 may perform for example encoding/decoding, modulating/demodulating and multiplexing/demultiplexing, and various types of signal processing of layers (such as the L1, the medium access control (MAC), the radio link control (RLC) and the packet data convergence protocol (PDCP)). Instead of the controller 2321, the BB processor 2326 may have a part or all of the above logic functions. The BB processor 2326 may be a memory storing communication control programs or a module including a processor configured to execute programs and a related circuit. Updating programs may change functions of the BB processor 2326. The module may be a card or a blade inserted into a slot of the base station device 2320. Alternatively, the module may be a chip installed on the card or the blade. The RF circuit 2327 may include for example a mixer, a filter or an amplifier, and transmits and receives a wireless signal via the antenna 2310.

As shown in FIG. 12, the radio communication interface 2325 may include multiple BB processors 2326. For example, the multiple BB processors 2326 may be compatible with multiple frequency bands used by the eNB 2300. As shown in FIG. 12, the radio communication interface 2325 may include multiple RF circuits 2327. For example, the multiple RF circuits 2327 may be compatible with multiple antenna elements. Although FIG. 12 shows an example in which the radio communication interface 2325 includes multiple BB processors 2326 and multiple RF circuits 2327, the radio communication interface 2325 may include a single BB processor 2326 or a single RF circuit 2327.

In the eNB 2300 shown in FIG. 12, the transceiving apparatus 320 described with reference to FIG. 3 may be implemented by the radio communication interface 2325. At least part of the functions of units described with reference to FIG. 1 to FIG. 3 may be implemented by the controller 2321. For example, the controller 2321 may perform at least part of the functions of the units described with reference to FIG. 1 to FIG. 3 by executing programs stored in the memory 2322.

[Application Example Regarding Car Navigation Device]

Figure 13:
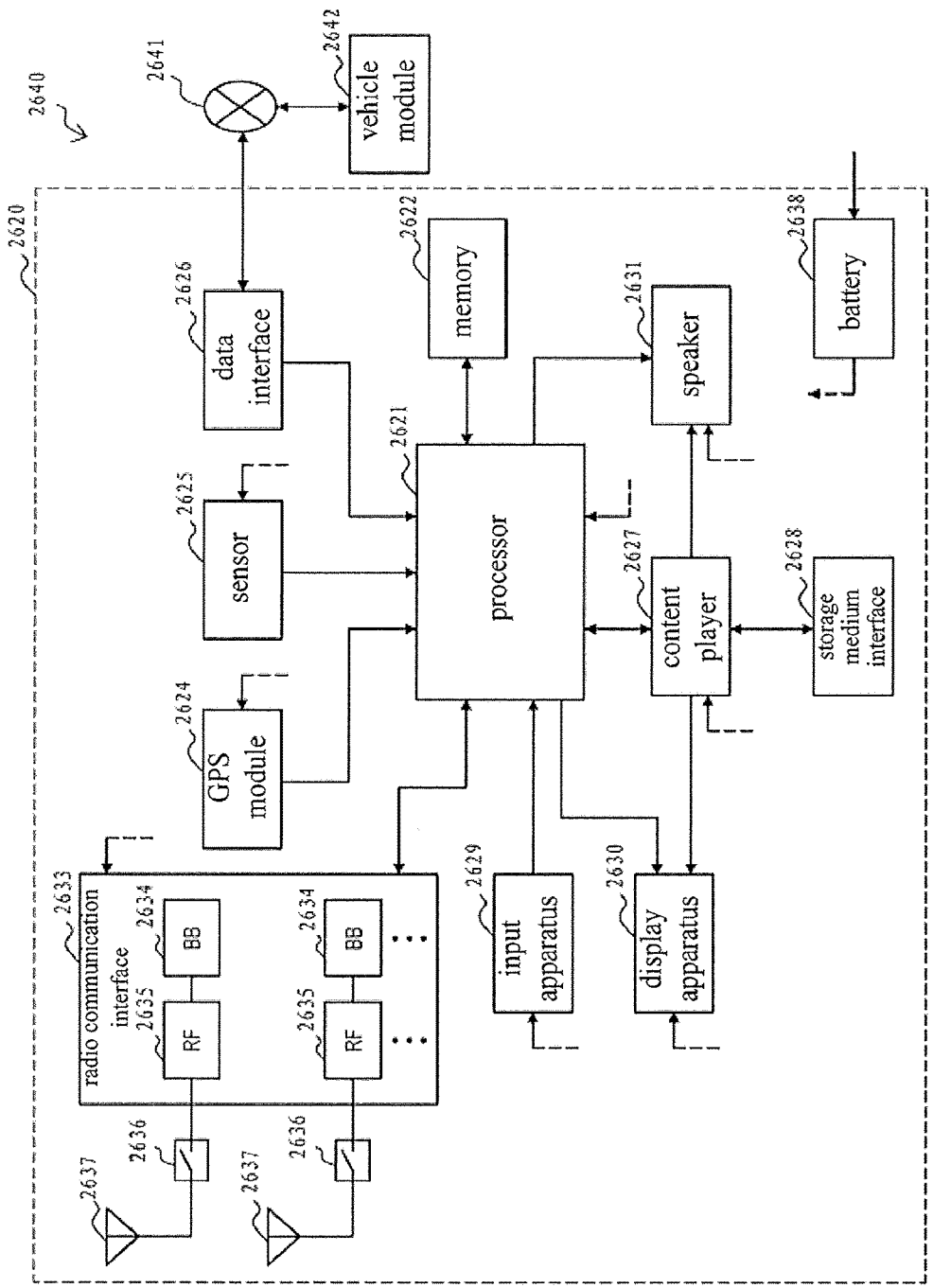
FIG. 13 is a block diagram showing an example of a schematic configuration of an car navigation device to which the technology of the present disclosure may be applied.

FIG. 13 is a block diagram showing an example of a schematic configuration of a car navigation device 1320 to which the technology of the present disclosure may be applied. The car navigation device 1320 includes a processor 1321, a memory 1322, a global positioning system (GPS) module 1324, a sensor 1325, a data interface 1326, a content player 1327, a storage medium interface 1328, an input apparatus 1329, a display apparatus 1330, a speaker 1331, a radio communication interface 1333, one or more antenna switches 1336, one or more antennas 1337 and a battery 1338.

The processor 1321 may be for example a CPU or a SoC, and controls a navigation function and another functions of the car navigation device 1320. The memory 1322 includes a RAM and a ROM, and stores programs executed by the processor 1321 and data.

The GPS module 1324 measures a position of the car navigation device 1320 (such as a latitude, a longitude and a height) using a GPS signal received from a GPS satellite. The sensor 1325 may include a set of sensors, such as a gyro sensor, a geomagnetic sensor and an air pressure sensor. The data interface 1326 is connected to for example a vehicle network 1341 via a terminal not shown, and acquires data generated by the vehicle (such as data on a vehicle velocity).

The content player 1327 reproduces content stored in a storage medium (such as a CD and a DVD) which is inserted into the storage medium interface 1328. The input apparatus 1329 includes a touch sensor configured to detect touch on a screen of the display apparatus 1330, a button or a switch, and receive an operation or information input by a user. The display apparatus 1330 includes a screen of for example an LCD or an OLED display, and displays an image of a navigation function or reproduced content. The speaker 1331 outputs sound of the navigation function or reproduced content.

The radio communication interface 1333 supports any cellular communication scheme (such as LTE and LTE-advanced) and performs wireless communication. Radio communication interface 1333 may generally include for example a BB processor 1334 and an RF circuit 1335. The BB processor 1334 may perform for example encoding/decoding, modulating/demodulating and multiplexing/demultiplexing, and performs various types of signal processing for wireless communication. In addition, the RF circuit 1335 may include for example a mixer, a filter and an amplifier, and transmits and receives a wireless signal via the antenna 1337. The radio communication interface 1333 may be a chip module having a BB processor 1334 and an RF circuit 1335 integrated thereon. As shown in FIG. 13, the radio communication interface 1333 may include multiple BB processors 1334 and multiple RF circuits 1335. Although FIG. 13 shows the example in which the radio communication interface 1333 includes multiple BB processors 1334 and multiple RF circuits 1335, the radio communication interface 1333 may also include a single BB processor 1334 and a single RF circuit 1335.

Further, in addition to the cellular communication scheme, the radio communication interface 1333 may support other types of wireless communication schemes, such as a short distance wireless communication scheme, a near field communication scheme and a wireless LAN scheme. In this case, for each wireless communication scheme, the radio communication interface 1333 may include the BB processor 1334 and the RF circuit 1335.

Each of the antenna switches 1336 switches connection destinations of the antenna 1337 among multiple circuits (such as circuits for different wireless communication schemes) included in the radio communication interface 1333.

Each of the antennas 1337 includes a single or multiple antenna elements (such as multiple antenna elements included in an MIMO antenna) and is used for the radio communication interface 1333 to transmit and receive a wireless signal. As shown in FIG. 13, the car navigation device 1320 may include multiple antennas 1337. Although FIG. 13 shows the example in which the car navigation device 1320 includes multiple antennas 1337, the car navigation device 1320 may include a single antenna 1337.

In addition, the car navigation device 1320 may include an antenna 1337 for each wireless communication scheme. In this case, the antenna switch 1336 may be omitted from the configuration of the car navigation device 1320.

The battery 1338 supplies power to blocks of the car navigation device 1320 shown in FIG. 13 via feeder lines. The feeder lines are shown partially as dotted lines in FIG. 13 The battery 1338 accumulates the power provided by the vehicle.

In the car navigation device 1320 shown in FIG. 13, the transceiving apparatuses described with reference to FIG. 4 and FIG. 7 may be implemented by the radio communication interface 1333. The processor 1321 may perform at least part of the functions of units described with reference to FIG. 1, FIG. 2, FIG. 4, FIG. 6, FIG. 7 and FIG. 9 by executing programs stored in the memory 1322.

The technology of the present disclosure may be implemented as a vehicle system (or a vehicle) 1340 including one or more of the car navigation device 1320, the in-vehicle network 1341 and the vehicle module 1342. The vehicle module 1342 generates vehicle data (such as a vehicle velocity, an engine velocity and fault information), and outputs the generated data to the vehicle network 1341.

In the description of specific embodiments of the present disclosure above, features described and/or illustrated in one embodiment may be used in one or more other embodiments in a same or similar manner, may be combined with features in other embodiments, or substituted for features in other embodiments.

It should be noted that, terms "including/comprising" used herein refer to existing of features, elements, steps or components, but does not exclude existing or adding of one or more other features, elements, steps or components.

In the above embodiments and examples, reference numerals of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed chronologically in other time order, in parallel or independently. Therefore, the order for performing the method described in the description does not limit the technical scope of the present disclosure.

Although the present disclosure is disclosed by description of the embodiments of the present disclosure above, it should be understood that all the embodiments and examples described above are only exemplary rather than restrictive. For those skilled in the art, various changes, improvements or equivalents may be designed on the present disclosure within the spirit and scope of the appended claims. The changes, the improvements or the equivalents should be regarded as falling within the protection scope of the present disclosure.

The invention claimed is:

1. A wireless communication device, comprising:
   circuitry configured to:
   acquire, based on auxiliary information on propagation limitation of a source device as a source of information propagation, device information of candidate devices capable of establishing direct communication with the source device;
   select, from the candidate devices, a target device which is to establish direct communication with the source device based on positions of the source device and the candidate devices, the target device serving as a relay node for the information propagation;
   determine a transmission resource for the direct communication between the source device and the target device; and
   generate a transmission resource scheduling indication including information of the transmission resource and transmit the transmission resource scheduling indication to the target device, without receiving a scheduling request from the target device.

2. The wireless communication device according to claim 1, wherein the auxiliary information on propagation limitation indicates a motion direction and/or a position relative to the source device, of a desired object of the information propagation.

3. The wireless communication device according to claim 2, wherein the auxiliary information on propagation limitation comprises a velocity and a motion direction of the source device, and an identifier of information to be propagated.

4. The wireless communication device according to claim 1, wherein the target device satisfies one or more of the following conditions:
   being located in an information propagation direction with respect to the source device;
   having a motion direction same as the source device.

5. The wireless communication device according to claim 1, wherein the candidate devices are devices which have transmitted response signals to the wireless communication device in response to a discovery signal transmitted by the source device, wherein the response signal containing the device information.

6. The wireless communication device according to claim 5, wherein the circuitry is further configured to determine a time delay; and
   determine a device which responds to the discovery signal within the time delay as the candidate device.

7. The wireless communication device according to claim 6, wherein in a case where the source device is a relay node of another device, the time delay is determined based on the number of relay stages of the source device relative to an initial information source of the information propagation.

8. The wireless communication device according to claim 7, wherein the source device is a vehicle, and the circuitry is configured to select the target device based on relative velocities of the candidate devices relative to the source device, wherein the candidate device having a low relative velocity has a high priority, or
   the circuitry is configured to select the target device based on distances of the candidate devices from the source device, wherein the candidate device having a large distance from the source device has a high priority.

9. The wireless communication device according to claim 1, wherein information propagated from the source device is road safety information, and the candidate devices comprise a vehicle and/or a roadside device.

10. The wireless communication device according to claim 1, wherein the wireless communication device is a serving base station of the source device, and the circuitry is further configured to:
    receive response signals from the candidate devices, the response signals containing device information of the candidate devices, wherein the device information containing identifiers and positions of the candidate devices.

11. The wireless communication device according to claim 10, wherein the circuitry is further configured to:
    allocate, for the source device, a first transmission resource for transmitting a discovery signal and/or reporting, to the base station, information to be propagated, and
    transmit the transmission resource scheduling indication of the allocated transmission resource.

12. The wireless communication device according to claim 10, wherein the circuitry is further configured to:
    select a plurality of target devices from the candidate devices, and determine the relay node from the plurality of target devices based on positions of the plurality of target devices, and allocate, for the relay node, a second transmission resource for relaying.

13. The wireless communication device according to claim 12, wherein the circuitry is further configured to transmit the transmission resource scheduling indication to the plurality of target devices.

14. The wireless communication device according to claim 10, wherein the circuitry is further configured to: notify another base station of information on the response signal or acquire information on a corresponding candidate device from another base station.

15. The wireless communication device according to claim 1, wherein the wireless communication device is the source device, and the wireless communication device is further:
configured to:
transmit, to the candidate devices, a discovery signal containing an identifier of the source device and the auxiliary information on propagation limitation; and
receive, from the candidate devices, response signals containing information on identifiers, positions and motion directions of the candidate devices.

16. The wireless communication device according to claim 15, wherein the wireless communication device comprises a plurality of antennas, and the circuitry is further configured to generate weighting coefficients for a signal to be transmitted at the antennas based on a position of the target device, to perform directional direct communication with the target device.

17. A wireless communication method, comprising:
acquiring, based on auxiliary information on propagation limitation of a source device as a source of information propagation, device information of candidate devices capable of establishing direct communication with the source device;
selecting, from the candidate devices, a target device which is to establish direct communication with the source device based on positions of the source device and the candidate devices, the target device serving as a relay node for the information propagation;
determining a transmission resource for the direct communication between the source device and the target device; and
generating a transmission resource scheduling indication including information of the transmission resource and transmitting the transmission resource scheduling indication to the target device, without receiving a scheduling request from the target device.

18. The wireless communication method according to claim 17, wherein the auxiliary information on propagation limitation indicates a motion direction and/or a position relative to the source device, of a desired object of the information propagation, or
the auxiliary information on propagation limitation comprises a velocity and a motion direction of the source device, and an identifier of information to be propagated.

19. The wireless communication method according to claim 17, further comprising:
determining a time delay; and
determining a device which responds to the discovery signal within the time delay as the candidate device.

20. The wireless communication method according to claim 17, further comprising:
selecting the target device based on relative velocities of the candidate devices relative to the source device, wherein the candidate device having a low relative velocity has a high priority, or
selecting the target device based on distances of the candidate devices from the source device, wherein the candidate device having a large distance from the source device has a high priority.

21. The wireless communication method according to claim 17, further comprising:
receiving response signals from the candidate devices, the response signals containing device information of the candidate devices, wherein the device information containing identifiers and positions of the candidate devices.

22. The wireless communication method according to claim 21, further comprising:
allocating, for the source device, a first transmission resource for transmitting a discovery signal and/or reporting, to the base station, information to be propagated, and
transmit the transmission resource scheduling indication of the allocated transmission resource to the source device.

23. The wireless communication method according to claim 21, further comprising:
selecting a plurality of target devices from the candidate devices, and determine the relay node from the plurality of target devices based on positions of the plurality of target devices, and allocate, for the relay node, a second transmission resource for relaying.

24. The wireless communication method according to claim 23, further comprising:
transmitting the transmission resource scheduling indication to the plurality of target devices.

25. The wireless communication method according to claim 23, further comprising:
notifying another base station of information on the response signal or acquire information on a corresponding candidate device from another base station.

26. The wireless communication method according to claim 17, further comprising:
transmitting, to the candidate devices, a discovery signal containing an identifier of the source device and the auxiliary information on propagation limitation; and
receiving, from the candidate devices, response signals containing information on identifiers, positions and motion directions of the candidate devices.

27. The wireless communication method according to claim 26, further comprising:
generating weighting coefficients for a signal to be transmitted at a plurality of antennas based on a position of the target device, to perform directional direct communication with the target device.

* * * * *